US012744053B1

(12) United States Patent
Chang et al.

(10) Patent No.: US 12,744,053 B1
(45) Date of Patent: Sep. 22, 2026

(54) REAL TIME VOICE MODE GENERATIVE RESPONSE ENGINE WITH TURN DETECTION

(71) Applicant: OpenAI OpCo, LLC, San Francisco, CA (US)

(72) Inventors: Wayne Chang, Menlo Park, CA (US); Mianna Chen, San Francisco, CA (US); Bogumil Kazimierz Giertler, San Francisco, CA (US); Tomer Kaftan, San Francisco, CA (US); Alex Kirillov, San Francisco, CA (US); Edede Oiwoh, San Francisco, CA (US); Olaoluwa Okelola, San Francisco, CA (US); Raul Puri, San Francisco, CA (US); Brendan Quinn, San Francisco, CA (US); Ievgen Varavva, San Mateo, CA (US); Tao Xu, Palo Alto, CA (US); Rowan Zellers, San Francisco, CA (US); Yu Zhang, Mountain View, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/256,715

(22) Filed: Jul. 1, 2025

Related U.S. Application Data

(63) Continuation of application No. 19/098,690, filed on Apr. 2, 2025, now abandoned.

(51) Int. Cl.
*G10L 25/78* (2013.01)
*G10L 15/04* (2013.01)
(Continued)

(52) U.S. Cl.
CPC .............. *G10L 25/78* (2013.01); *G10L 15/22* (2013.01); *G10L 15/04* (2013.01); *G10L 15/16* (2013.01); *G10L 2015/223* (2013.01)

(58) Field of Classification Search
CPC ....... G10L 15/04; G10L 15/16; G10L 15/183; G10L 15/22; G10L 2015/221; G10L 2105/223; G10L 25/78
(Continued)

(56) References Cited

U.S. PATENT DOCUMENTS 6,496,799 B1 12/2002 Pickering
6,882,973 B1 4/2005 Pickering
(Continued)

FOREIGN PATENT DOCUMENTS

CN 117253485 A * 12/2023 ............. G10L 15/22

OTHER PUBLICATIONS

Pinto, et al. "Predictive turn-taking: Leveraging language models to anticipate turn transitions in human-robot dialogue." 2024 33rd IEEE International Conference on Robot and Human Interactive Communication (ROMAN). IEEE, Aug. 2024, pp. 1733-1738. (Year: 2024).*

(Continued)

*Primary Examiner* — James S Wozniak
(74) *Attorney, Agent, or Firm* — Polsinelli PC

(57) ABSTRACT

Disclosed are systems, apparatuses, processes, and computer-readable media for real-time modes of a generative response engine. The present technology includes different technologies to improve real-time operation to create natural and dynamic interactions to user experiences. A method of the present technology includes receiving audio frames from a client device; determining that a first portion of the audio frames includes speech of a user during a speech instance; transmitting the first portion of the audio frames that
(Continued)

includes the speech to a generative response engine; determining that the speech instance has concluded; and sending a signal to the generative response engine to perform an inference operation based on the first portion of the audio frames.

18 Claims, 17 Drawing Sheets

(51) Int. Cl.
*G10L 15/16* (2006.01)
*G10L 15/22* (2006.01)

(58) Field of Classification Search
USPC .............................. 704/232, 253, 270, 270.1
See application file for complete search history.

(56) References Cited

U.S. PATENT DOCUMENTS

| | | | | |
|---|---|---|---|---|
| 7,437,286 | B2 | 10/2008 | Pi et al. | |
| 10,121,471 | B2 | 11/2018 | Hoffmeister et al. | |
| 11,615,239 | B2 * | 3/2023 | Brdiczka | H04L 51/04 704/9 |
| 12,243,517 | B1 * | 3/2025 | Mehrabani | G10L 15/063 |
| 12,322,384 | B1 * | 6/2025 | Ramachandran | G10L 15/04 |
| 2016/0316059 | A1 * | 10/2016 | Nuta | G06N 7/01 |
| 2016/0358598 | A1 * | 12/2016 | Williams | G10L 17/02 |
| 2018/0330723 | A1 * | 11/2018 | Acero | G10L 15/30 |
| 2019/0318759 | A1 * | 10/2019 | Doshi | G10L 15/04 |
| 2020/0342874 | A1 * | 10/2020 | Teserra | G06F 40/263 |
| 2023/0053341 | A1 * | 2/2023 | Konzelmann | G06N 20/00 |
| 2023/0214597 | A1 * | 7/2023 | Lin | G06F 40/211 704/9 |
| 2023/0230578 | A1 * | 7/2023 | Sharifi | G10L 13/00 704/235 |
| 2023/0230585 | A1 * | 7/2023 | Anderson | G06F 40/30 704/232 |
| 2023/0368781 | A1 * | 11/2023 | Choi | G10L 25/78 |
| 2024/0312460 | A1 * | 9/2024 | Konzelmann | G10L 15/18 |
| 2025/0094456 | A1 * | 3/2025 | Gu | G06F 16/353 |

OTHER PUBLICATIONS

Alexander Veysov and Dimitrii Voronin, "One Voice Detector to Rule Them All", The Gradient, url: <https://thegradient.pub/one-voice-detector-to-rule-them-all/%3E>, Feb. 19, 2022 (22 pages).

Domingo, Enric, "Claude 3.5 Sonnet API: This is howyou integrate the best LLM into yourAPP", Medium, url: <https://medium.com/@enricdomingo/claude-sonnet-3-5-api-integrating-the-best-llm-into-our-app-7ec4623e2dac%3E>, Jun. 23, 2024 (24 pages).

"Server-Sent Events: A WebSockets alternative ready for another look", ably, url: <https://ably.com/topic/server-sent-events%3E>, Jun. 28, 2023 {7 pages).

"Server-Sent Events W3C Working Draft Apr. 23, 2009", Ed. Ian Hickson, W3C, url: <https://www.w3.org/TR/2009/WD-eventsource-20090423/%3E>, Apr. 23, 2009 (15 pages).

"ETSI TS 126 071", Digital cellular telecommunications system (Phase 2+) (GSM); Universal Mobile Telecommunications System (UMTS); LTE; Mandatory speech CODEC speech processing functions; AMR speech Codec; General description (3GPP TS 26.071 version 15.0.0 Release 15), Jul. 2018 (13 pages).

"Genesys Audio Connector", Genesys Cloud CX—Beta HQ, url: <https://community.genesys.com/discussion/genesys-audio-connector%3E>, Dec. 1, 2023 (18 pages).

"Genesys Cloud—Feb. 10, 2025", Genesys Cloud Release Notes, Genesys Cloud Resource Center, url: <https://help.mypurecloud.com/releasenote/february-10-2025/%3E>, Feb. 10, 2025 (4 pages).

"Genesys Cloud—Jan. 13, 2025", Genesys Cloud Release Notes, Genesys Cloud Resource Center, url: <https://help.mypurecloud.com/releasenote/january-13-2025/%3E>, Jan. 13, 2025 (3 pages).

"Genesys Cloud—Jan. 27, 2025", Genesys Cloud Release Notes, Genesys Cloud Resource Center, url: <https://help.mypurecloud.com/releasenote/january-27-2025/%3E>, Jan. 27, 2025 (4 pages).

Mishra, Anubhav and Jessica Ho, "Enhancing customer service experiences using Conversational AI: Power your contact center with Amazon Lex and Genesys Cloud", AWS Blogs, url: <https://aws.amazon.com/blogs/machine-learning/enhancing-customer-service-experiences-using-conversational-ai-power-your-contact-center-with-amazon-lex-and-genesys-cloud/%3E>, Aug. 3, 2021 (5 pages).

Sharma, Shilpa, et al., "Voice Activity Detection", International Journal of Creative Research Thoughts: An International Open Access, Peer Reviewed, Refereed Journal, vol. 9, Issue 5, May 2021 (4 pages).

Sjoberg, J. et al., "Real-Time Transport Protocol (RTP) Payload Format and File Storage Format for the Adaptive Multi-Rate (AMR) and Adaptive Multi-Rate Wideband (AMR-WB) Audio Codecs", Network Working Group Request for Comments: 3267, The Internet Society, Jun. 2002 (49 pages).

Vardhini, Lakshmi, "Dialogflow CX for Effortless Chatbot Creation and Testing with an Intuitive UI", cloudthat, url: <https://www.cloudthat.com/resources/blog/dialogflow-cx-for-effortless-chatbot-creation-and-testing-with-an-intuitive-ui%3E>, Jun. 21, 2023 (4 pages).

"Web Speech API Specification", Eds. Glen Shires and Hans Wennborg, Contributors to the Web Speech API Specification, Speech API Community Group, url: <https://dvcs.w3.org/hg/speech-api/raw-file/tip/webspeechapi%3E>, Jun. 6, 2014 (16 pages).

* cited by examiner

REAL TIME VOICE MODE GENERATIVE RESPONSE ENGINE WITH TURN DETECTION

CROSS-REFERENCE TO RELATED APPLICATIONS

This application claims the benefit of priority to U.S. application Ser. No. 19/098,690, filed on Apr. 2, 2025, entitled DYNAMIC VOICE DETECTION FOR REAL TIME MODES IN A GENERATIVE RESPONSE ENGINE, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DESCRIPTION

Figure 1:
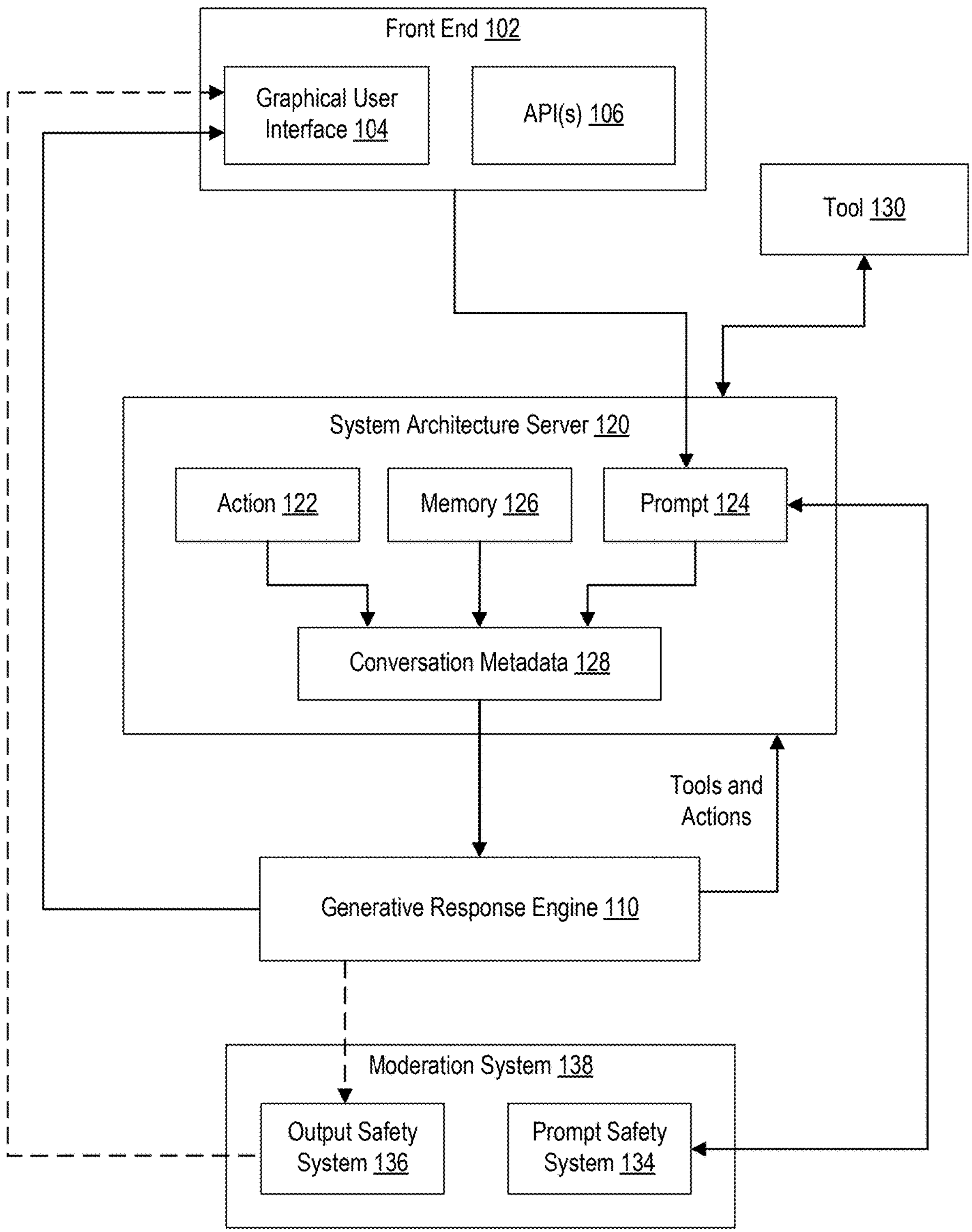
FIG. 1 illustrates an example system supporting a generative response engine during inference operations in accordance with some embodiments of the present disclosure.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation.

Generative response engines have generally used text interfaces because the text provides the entire context of the inquiry. For example, a text message is an independent clause and the generative response engine does not need additional context because the user implicitly ends their communication based on sending the text.

However, in speech-based interactions, providing a high-quality user experience is difficult for such an application. For example, in real-time conversation, pauses and interruptions are common. The identification of a complete speech instance, which is the time at which speech begins to the time at which speech ends is a non-trivial challenge because human speech includes pauses to consider the next words and then continue their speech. While modern ML models strive for low-latency performance, some factors can introduce delays, such as network speed, server processing time, and the complexity of the query. High latency can disrupt the flow of conversation, making interactions feel sluggish and less natural, especially in applications requiring quick feedback, such as live customer support, learning tools, or collaborative tools. Reducing latency through optimized server infrastructure, model efficiency improvements, and edge computing can enhance the user experience by making interactions feel more seamless and responsive.

Conventional deterministic sliding window-based algorithms for speech detection are not sufficient because they add latency and require a steady stream of audio to prevent detection of the end of the speech instance. For example, in sliding window-based algorithms, users frequently emit additional audio cues to prevent the audio detection from ending while the user considers their next words. Sliding window-based algorithms add a significant amount of latency and cause longer response delays that are unnatural and degrade the user experience. In either case, the sliding window-based algorithms can end the speech detection too slowly, creating long delays that are unnatural or can end the speech detection too quickly, preventing the user from providing the complete speech.

In some cases, generative response engines have conventionally spent a significant amount of processing power trying to engage in a natural conversation while also maintaining a low latency response period. However, additional processing often adds latency due to the processing power required and increases power consumption and bandwidth resources.

In addition, interruptions are a natural part of human conversation, allowing for clarifications, quick shifts in topics, or real-time adjustments. However, generative response engines are not trained to handle interruptions in the same way humans do. Rather, generative response engines process input as discrete messages rather than maintaining an awareness of mid-sentence changes or abrupt shifts in context. If a user interrupts with new input while the generative response engine is still generating a response, the system does not modify or cancel its output but instead processes the new input separately. The interruption can create a disjointed experience, where responses may not seamlessly align with the user's evolving intent. However, not all audio is an interruption because various audio cues from a person can indicate a mental process (e.g., "yes").

Multi-modal generative response engines are also trained using static images, language, and audio for generic tasks. Video is generally not used for large models because video tokens consume a significant volume of tokens based on the features and the high frame rate, which can exponentially increase the cost of training a model. For example, video frames consume 65 tokens per frame with a frame rate of 30 frames per second. Audio frames consume 10 tokens per frame with a frame rate of 10 frames per second (e.g., 1950 tokens per second for video as compared 100 tokens per second for audio).

Systems, apparatuses, processes (also referred to as methods), and computer-readable media (collectively referred to as "systems and techniques") are described herein for real-time modes of a generative response engine in accordance with some aspects of the disclosure. For example, an apparatus is configured to include a dynamic speech instance detection based on the identification of silence and detecting whether the input (e.g., speech) corresponds to a complete thought. For example, a complete thought is an independent clause, which can be a complete sentence or an incomplete sentence. More examples of independent clauses are further described below. In some aspects, audio frames are preflighted in the generative response engine, and quick identification of when the speech allows the generative response engine to respond within a natural delay period (e.g., 300 milliseconds).

In some aspects, the real-time mode can also use video frames (or images) provided by a client device associated with a user. In some aspects, the video frames can be included in the input into the generative response engine. However, the generative response engine has a limited context window, and the system is configured to limit frames provided to the generative response engine. The client device may be configured to capture or send images variably based on whether the user is speaking. The system can also determine which video frames to provide to the generative response engine (e.g., at an aperiodic rate). The selective provisioning of video frames to the generative response engine allows improved context without overloading the generative response engine with extraneous detail based on video token volume.

In some aspects, an interruption detection engine is configured to identify interruptions and provide additional functionality to improve the conversation with the generative response engine. For example, the audio frames (e.g., including audio tokens or digital audio) transmitted to the client device may be tracked. In some aspects, when an interruption is detected, the interruption detection engine is configured to cause the generative response engine to stop responding and update the state of the generative response engine to discard content that is not presented to the client device (e.g., and the user).

FIG. 1 illustrates an example system supporting a generative response engine during inference operations in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., a generative pre-trained transformer) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses graphical user interface 104 and Application Programming Interfaces (APIs) 106 that facilitate communication, input processing, and output presentation. Generally, users interact through a graphical user interface 104 that often includes a conversational interface, and applications interact through application programming interface (API) 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some embodiments, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. But even when a model doesn't directly accept certain types of inputs, the front end 102 might be able to receive different types of inputs, which can be converted to inputs that are accepted by the generative response engine 110. For example, a language model is generally configured to accept text, but the front end 102 can accept voice and convert it to text or accept an image and create a textual representation.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. For example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the front end 102 might have access to a memory 126 where facts about the user account have been stored. In some embodiments, these facts can have been identified as facts worth storing by the generative response engine and the front end 102 has stored these facts at the direction of the generative response engine. Accordingly, these facts can be provided to the generative response engine 110 along with a user-provided prompt so that the generative response engine has access to these facts when generating a response.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints.

The graphical user interface 104 is also configured to display the responses from the generative response engine, which might include text, code snippets, images, or interactive elements.

In some embodiments, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document. In some embodiments, the generative response engine 110 can provide instructions to the front end 102 to record facts in a personalization notepad. Accordingly, the graphical user interface 104 does not always display all of the output of the generative response engine.

As noted above, the front end 102 can also provide one or more APIs 106. APIs enable developers to integrate the generative response engine's capabilities into external applications and services. They provide programmatic access to the generative response engine, allowing for customized interactions and functionalities.

The APIs 106 can accept structured requests containing prompts, context, and configuration parameters. For example, an API can be used to provide prompts and divide the prompt into system prompts and user prompts. In some embodiments, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the generative response engine's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a system architecture server 120. The function of system architecture server 120 is to manage and organize the flow of data among key subsystems, enabling the generative response engine 110 to generate responses that are contextually relevant, accurate, and enriched with additional information as required.

Action 122 facilitates auxiliary tasks that extend beyond basic text generation. In some embodiments, action 122 can be actions that correspond to an API 106. In some embodiments, action 122 can be agentic actions that the generative response engine 110 decides to take to carry out a user's intent as described in the prompt.

Prompt 124 is the request or command provided by the user account through front end 102. In some embodiments, prompt 124 can be further supplemented by a system prompt and other information that might be included by graphical user interface 104 or API 106. In some embodiments, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. Generally, prompt 124 will include an entire conversation thread, but in some instances, prompt 124 might need to be shortened if it exceeds a maximum accepted length (generally measured by a number of tokens).

System architecture server 120 can also route prompts and response through moderation system 138, which can be separate or part of system architecture server 120. In some embodiments, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some embodiments, prompt safety system 134 can utilize text pattern matching, classifiers, and/or other AI techniques.

Since prompts can evolve over time through the course of a conversation, consisting of prompts and responses, prompts can be repeatedly evaluated at the turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some embodiments, memory can be recorded at the instruction of generative response engine 110 when generative response engine 110 identifies a fact or data that it determines should be saved in memory because it might be useful in later conversations or sessions.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from system architecture server 120) and generates outputs. In some embodiments, the generative response engine is a generative transformer, or autoregressive transformer, but it could utilize other architectures. In some examples, the transformer is a language model that is configured to receive tokens (e.g., language tokens) representing different types of encoded features, identify a task within the tokens and generate a response based on learned information. For example, the language model is trained using a wide variety of information to have a very broad domain capabilities that emulates human neural functionality based on a task that is described in natural language. In some examples, the transformer is multi-modal transformer that can use audio tokens (or embeddings thereof), visual tokens (or embeddings thereof), and language (or embeddings thereof) as needed.

A core feature of generative response engine 110 is to generate content in response to prompts. When the generative response engine 110 is a GPT, it is configured to receive inputs from front end 102 that provide guidance on a desired output. The generative response engine can analyze the input and identify relevant patterns and associations in the data, and it has learned to generate a sequence of tokens that are predicted as the most likely continuation of the input. The generative response engine 110 generates responses by sampling from the probability distribution of possible tokens, guided by the patterns observed during its training. In some embodiments, the generative response engine 110 can generate multiple possible responses before presenting the final one. The generative response engine 110 can generate multiple responses based on the input, and these responses are variations that the generative response engine 110 considers potentially relevant and coherent.

In some embodiments, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some embodiments, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some embodiments, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user.

In some embodiments, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some embodiments, the responses might be returned by way of system architecture server 120.

Figure 2:
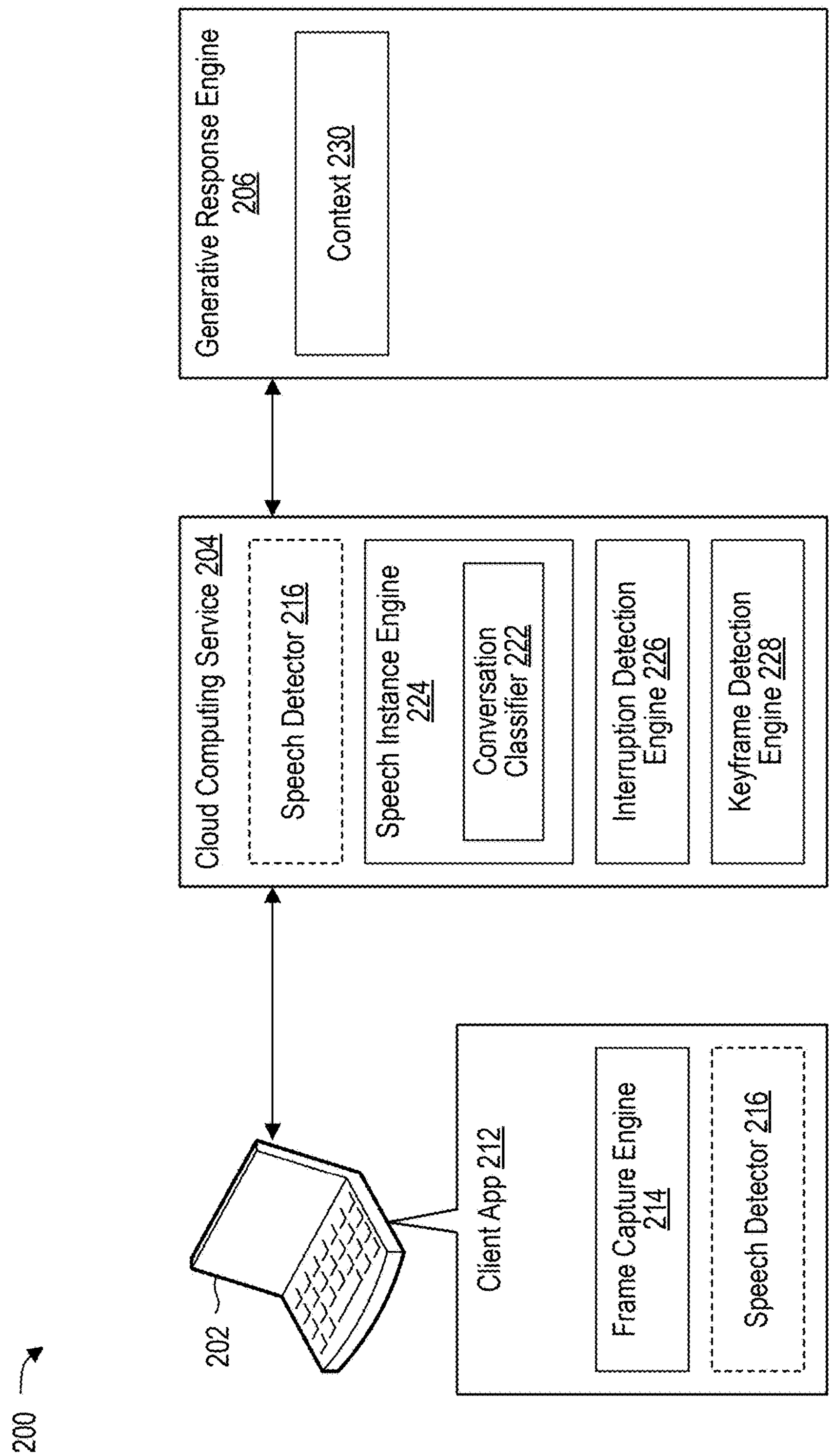
FIG. 2 is a conceptual block diagram for a real-time mode of a generative response engine in accordance with some aspects of the disclosure.

FIG. 2 is a conceptual block diagram for a real-time mode of a generative response engine in accordance with some aspects of the disclosure. For example, the real-time mode may be a voice or video mode that enables human speech to interact with the generative response engine. System 200 includes client device 202, cloud computing service 204 for logical operations (e.g., front end 102, system architecture server 120 of FIG. 1, etc.), and generative response engine 206 (e.g., generative response engine 110 in FIG. 1). In some aspects, cloud computing service 204 uses various arithmetic and logical processing units for logical behavior, and generative response engine 206 uses specialized multiply accumulate (MAC) units that are configured for parallel computations suited for ML models (e.g., graphics processing units, neural network processing units, etc.). Cloud computing service 204 and generative response engine 206 are illustrated as separate systems for separation of concerns due to the different hardware but can be employed within a single system in some cases.

In some aspects, client device 202 is a user device that provides natural language input such as audio or video. Although client device 202 is illustrated as a laptop, non-limiting examples of client device 202 includes a mobile phone, a tablet, a desktop computer, a processor-based watch device, or other suitable devices including at least voice input capability.

The client device 202 includes a client application 212, such as a native application, a cross-platform application using a webview renderer (e.g., Electron, etc.), or a web browser instrumented with instructions (e.g., a JavaScript bundle such as React or WebAssembly bytecode, etc.) to interface with the hardware of client device 202. In some cases, client application 212 can be retrieved from cloud computing service 204 (e.g., as a JavaScript bundle) or may be rendered via cloud computing service 204 via different techniques (e.g., server-side rendering, partial hydration, etc.).

The client application 212 may also include additional features such as a frame capture engine 214 that is configured to capture real-time audio and video data. For example, web browsers include various APIs to interface with hardware such as microphones, cameras, and so forth. Frame capture engine 214 is configured to capture audio received at client device 202, convert audio into discrete frames, and provide the frames to cloud computing service 204 at certain intervals for processing. For example, frame capture engine 214 may provide audio frames with 100 milliseconds of audio to cloud computing service 204.

Frame capture engine 214 may also be configured to provide discrete video frames to cloud computing service 204 to facilitate processing in conjunction with the captured audio. In some cases, client application 212 is configured to provide hybrid audio and video to allow further immersion and functionality. However, video consumes a significant portion of the token budget which can cause context compression, which reduces the amount of important content. In this case, frame capture engine 214 may be configured to capture image frames at a low frame rate such as 1 frame per second (fps) or 1 Hz. In some instance, frame capture engine might capture frames at a more conventional speed for video, like 30 fps or higher, but client application 212 sends frames to cloud computing service 204 at the low frame rate.

In some cases, client application 212 may also include a speech detector 216 that is configured to receive the audio and classify the audio as speech or not speech, which is also referred to as speech classification. In one illustrative example, speech detector 216 may include an ML model that is trained to identify the existence of human or synthesized human speech. The ML model trained for this task can be a small ML model having fewer parameters and layers based on a single classification task. For example, speech detector 216 may have a sufficiently small file size so it can be distributed to client device 202 from cloud computing service 204. Speech detector 216 is configured to identify the classification of speech in the audio frame (e.g., speech or no speech) and provide the classification with the audio frame.

In some aspects, speech detector 216 may also be conventional logic and rules and using patterns across frequency or other techniques to identify speech. The speech detector 216 may analyze the audio frame and classify the length of audio as speech or not, which is also referred to as speech detection. In some cases, speech detector 216, using an ML model, can classify smaller segments or audio with higher accuracy as compared to pure logic and pattern matching, which can affect the conversion of subsequent audio frames. In addition, speech detector 216, using an ML model, may also be able to identify speech that consumes a prefix of the audio frame and determine that silence exists based on a suffix of the frame. In this way, speech detector 216 can indicate that silence is detected at the end of the frame without requiring a full audio frame of silence.

In some aspects, speech detector 216 is optionally configured at client device 202 or the cloud computing service 204. In this aspect, the small ML model would not consume significant resources and may be executed using an on-device processor (e.g., a neural engine integrated into a system-on-chip (SoC) of client device 202). In this respect, by employing the speech detector 216 at client device 202, latency can be slightly reduced with on-device detection.

The cloud computing service 204 includes conversation classifier 222, speech instance engine 224, interruption detection engine 226, and keyframe detection engine 228.

In some aspects, speech instance engine 224 is configured to use the classifications from speech detector 216 and conversation classifier 222 to detect the end of a speech instance by a user. In some examples, the function of speech instance engine 224 is effectively a 'turn detector' that determines when a user has completed a speech instance (i.e., a speaking turn) such that the user expects generative response engine 206 to take its speaking turn in the conversation and respond.

Speech instance engine 224 can also have additional responsibilities such as to determine whether and how to provide the audio frames to generative response engine 206. For example, speech instance engine 224 may stream audio frames received from client device 202 to generative response engine 206 before the speech instance of the user is complete. A stream is a sequence of data elements made available over time, typically used for reading or writing data continuously. For example, speech instance engine 224 is configured to pre-flight a response from generative response engine 206 by streaming audio that will need to be processed to allow generative response engine 206 to begin initial processing on the audio. In some cases, pre-flighting refers to the preparatory steps and initial processing to reduce latency, such as tokenizing and performing initial inference at generative response engine 206 without the entire content.

Conversation classifier 222 is configured to classify speech instances (i.e., speech turns). Conversation classifier 222 can receive the audio frames from client device 202, perform the speech classification, and determine whether to analyze the speech based on the speech classification. For example, if the speech classification indicates speech is present in the audio frame, the conversation classifier may store the audio frame in a stack for analysis with other audio frames within that speech instance. In some aspects, when an audio frame indicates that speech is not detected, conversation classifier 222 is configured to determine whether the absence of speech is a pause in a speech instance or the end of the speech instance.

Conversation classifier 222 can be an algorithm that determines whether the audio frames with speech include an independent clause, which corresponds to a complete concept. For example, an independent clause can be a complete sentence or an incomplete sentence that consists of a subject and a predicate. For example, "because it is expensive" is incomplete because the word "because" is a marker that introduces a finite clause and qualifying content (e.g., a subject) for the finite clause is omitted. However, "too expensive" implies a subject and would form an independent clause. That is, an independent clause is an idea that is clear and understandable on its own, even if it is not a grammatically complete sentence.

Conversation classifier 222 can also be a trained machine learning model that has been trained on a labeled dataset of samples that end in a pause in a speech instance or end of a speech instance. For example, conversation classifier 222 may be a classifier model that is trained on a large corpus of language examples based on labeled examples.

Regardless of whether conversation classifier 222 is configured with logic or as a model, conversation classifier 222 is configured to identify whether the speech that is accumulated by cloud computing service 204 (e.g., in a stack) can be processed. Speech instance engine 224 can use the output of conversation classifier 222 to determine when a speech instance is completed, and to carry out additional tasks accordingly.

While conversation classifier 222 is illustrated as part of speech instance engine 224, these can also be separate services. In some cases, speech instance engine 224 may also send signals to generative response engine 206 to cancel current inference tasks, and/or may discard a response (e.g., tokens) received from generative response engine 206. For example, cloud computing service 204 may receive 30 audio frames (e.g., 3 seconds) from the client device and streams the audio frames to generative response engine 206 while audio frames from the client device being received. In this example, the last five frames (e.g., 500 ms of audio) indicate silence, which allows generative response engine 206 to begin forming a response even though the speech instance is not necessarily complete. In one example, the generative response engine can begin to send a stream of audio frames to cloud computing service 204. When cloud computing service 204 receives additional frames from client device 202, speech instance engine 224 may send a signal to generative response engine 206 to stop inference of the current audio frames because the content in the audio frames is incomplete (i.e. a speech instance continues and has not ended).

Speech instance engine 224 is configured to perform various logical operations in connection with the speech instance and pre-flight audio frames and processing at generative response engine 206 to reduce delays between the independent clause and response to that independent clause. In this manner, speech instance engine 224 and speech detector 216 can reduce delays between the end of the user speech instance and the beginning of synthesized speech at client device 202. For example, the speech instance engine 224 can reduce the latency by 300 milliseconds (e.g., as compared to dynamic windows that use heuristics) and create a more responsive and natural response, ensuring that the user stays engaged with generative response engine 206. For example, conventional window detection that closes the speech period based on silence inherently includes a delay based on that minimum length of silence, adding to latency. However, the window detection does not account for natural pauses in human speech. In some cases, longer delays between the end of the speech instance and the beginning of the synthesized speech instance permit the user's mind to focus on different topics, which can interrupt the user's train of thought. A person's memory may be conceptually considered a stack of concepts, and delays can cause that person's mind to add or remove concepts, thereby interrupting the flow of their mental process. Reducing the delay between the end of a speech instance and the response ensures that the user's mental state is unchanged and enables a naturally flowing conversation.

In some aspects, cloud computing service 204 may also include interruption detection engine 226 for identifying interruptions by the user and handling the interruptions in a contextually accurate manner. For example, interruption detection engine 226 is configured to drop contextual information based on whether that content was provided to client device 202 before the interruption. For example, speech instance engine 224 may have indicated that a user's speech instance has completed and can have signaled to generative response engine 206 that it should complete an inference operation on the audio associated with the speech instance. Generative response engine may accordingly perform or attempt to complete the inference operation based on the speech instance. While the inference operation is occurring, the user may begin a new speech instance or continue a previous speech instance. Speech detector 216 will detect the presence of speech, which can be used by interruption detection engine 226 to signal generative response engine 206 to cease the inference operation, which speech instance engine 224 determines when the user's speech instance has completed, and generative response engine 206 can re-start or continue inference operations and stream a response.

In some aspects, interruption detection engine 226 may also be configured to distinguish between audio cues that are feedback from a user that do not interrupt the synthesized speech context and are feedback or indicate a mental though process. For example, the interruption detection engine 226 may use the conversation classifier conversation classifier 222 to determine if the audio corresponds to actual speech or an indication of further audio is expected. For example, if the user provides a non-verbal audio cue, the interruption detection engine 226 will not detect an interruption. In some cases, verbal cues (e.g., "yes" and "okay") can also be distinguished from actual speech by the interruption detection engine 226 and the conversation classifier 222.

Generative response engine 206 may include context 230, which is also referred to as a context window, that includes tokens associated with previous input and previous responses and is limited to a certain number of tokens. For example, the ChatGPT-4-turbo model has a context limit of 128K tokens and LLAMA-3.2-1B (1 billion parameters) has a context limit of 128K tokens. Context 230 is provided to generative response engine 206 along with input (e.g., from client device 202) to ensure that previous responses and input are contextually accurate. In some cases, context 230 may need to be compressed due to token storage limitations, such as by compressing related concepts. In some cases, generative response engine 206 may drop content deemed unnecessary, such as images that were previously provided to generative response engine 206, previous prompts that are fundamentally different than the most recent prompt, and so forth.

In some cases, client device 202 may also be configured to provide images to generative response engine 206 with keyframe detection engine 228. For example, frame capture engine 214 provides images at 1 Hz and keyframe detection engine 228 is configured to provide keyframes that are relevant to inference at the generative response engine 206. In some aspects, keyframes are provided based on a fixed frame rate (e.g., 1 frame per second). For example, images associated with the user of client device 202 may be dropped, but images identifying non-verbal behavior (e.g., pointing) or images without the user, may be identified as a keyframe and provided to generative response engine 206. In some aspects, keyframe detection engine 228 limits the number of images to prevent overloading of context 230. The keyframes selected by keyframe detection engine 228 may be provided to generative response engine 206 and used for a speech instance. In some aspects, the generative response engine is not trained with video and while the audio and/or video is being input, the cloud computing service 204 may be unaware of the important video features. In this case, keyframe detection engine 228 is configured to select video frames while the input is being received and then, once the speech is identified as complete, keyframe detection engine 228 transmits the relevant video frames. The keyframe detection engine 228 selects only video frames having unique features to assist the generative response engine to reduce inference time. In some aspects, generative response engine 206 is not configured (e.g., trained) to identify features from video due large volume of tokens. In some aspects, the keyframe detection engine 228 may include an ML model trained to identify important frames associated with a mode, such as a voice input mode, or substantial changes that change context (e.g. using an optical flow that identifies the difference between two frames). In this way, limiting the video frames to relevant frames allows the generative response engine to perform inference using images captured at client device 202 client device 202 and improve the user experience.

Table 1 below illustrates an example configuration of cloud computing service 204 using a Node.js server with a conventional REST API and illustrates an example separation of concerns to abstract different components in FIG. 2.

TABLE 1

```
import express from "express";
import ViteExpress from "ViteExpress";
import type { Request, Response } from "express";
import "dotenv/config";
import { routes } from"./routes"); // Import routes
// Modules for the cloud computing service 204
import { SpeechDetector } from "./services/SpeechDetector";
import { ConversationClassifier } from "./services/ConversationClassifier";
import { SpeechInstanceDetector } from "./services/SpeechInstance";
import { InterruptionDetector } from "./services/InterruptionDetector";
import { KeyFrameDetector } from "./services/KeyFrameDetector";
/*LOAD MIDDLEWARE ***********************************************/
const app = express ( );    // REST API server
app.use(express.json ( ));
app.use(express.urlencoded ({ extended: true }));
/*LOAD ROUTES ****************************************************/
app.use(( ) => routes (SpeechDetector, InterruptionDetector,
                       KeyFrameDetector, ConversationClassifier,
                       SpeechDetector));
/* START THE SERVER **********************************************/
ViteExpress.default.listen(app, 3000, ( ) => {
   console.log('${process.env.NODE_ENV} server is listening on port 3000...')
});
```

In this case, speech detector 216, conversation classifier 222, speech instance engine 224, interruption detection engine 226, and keyframe detection engine 228 are modules that are loaded in the main loop and injected into the routes. In some cases, the modules (e.g., speech detector 216, conversation classifier 222, speech instance engine 224, interruption detection engine 226, and keyframe detection engine 228) can expose additional API endpoints, microservices, libraries, remote procedure calls, and functions for cloud computing service 204. Table 1 illustrates that the modules (speech detector 216, conversation classifier 222, speech instance engine 224, interruption detection engine 226, and keyframe detection engine 228) are injected into the routes for illustration purposes. In some cases, the route could also import the modules, and injection may be more appropriate in the event the service uses a singleton pattern.

Figure 3A:
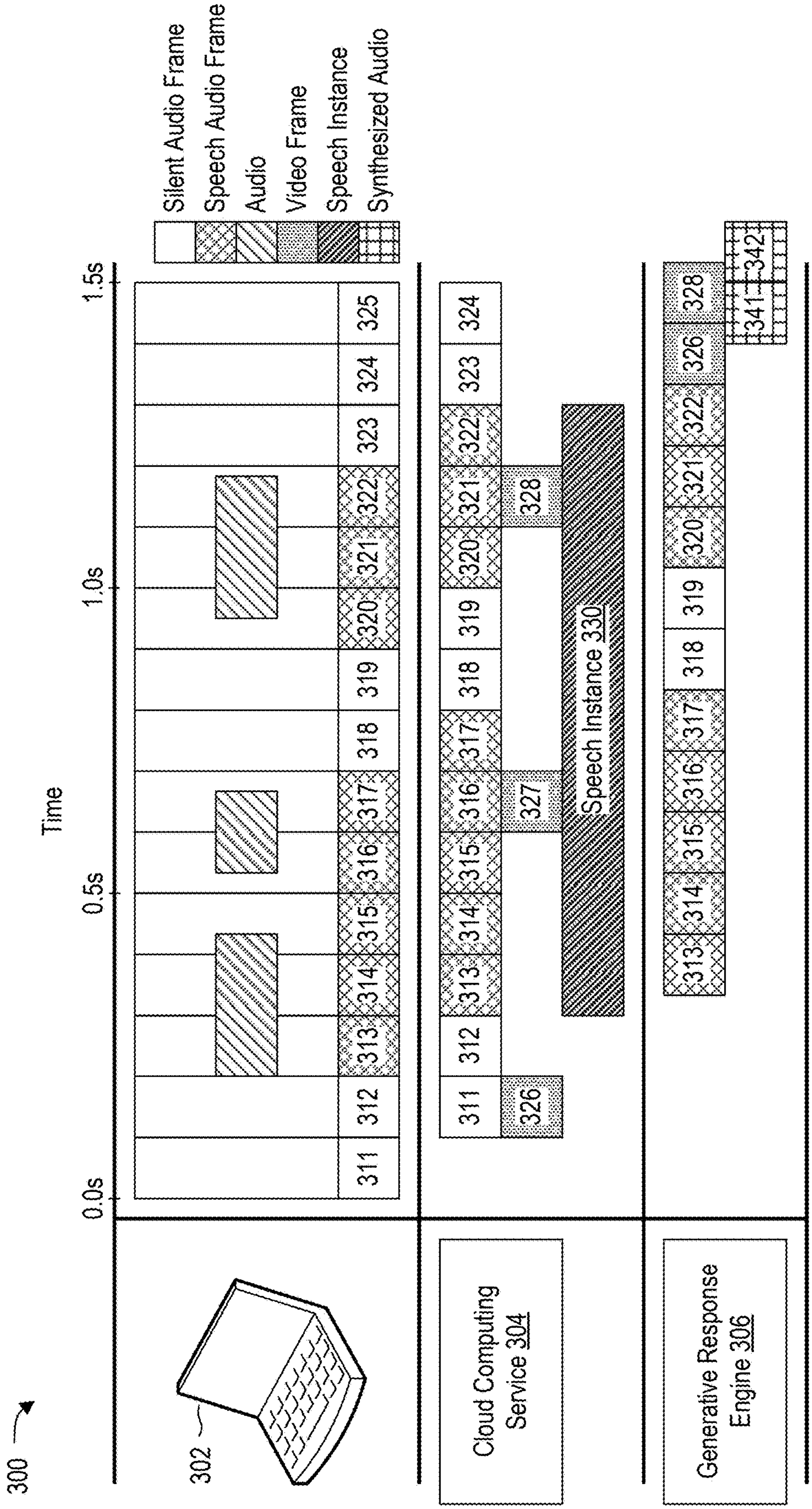
FIG. 3A is a swimlane diagram illustrating a real-time mode of a generative response engine in accordance with some aspects of the disclosure.

FIG. 3A is a swimlane diagram 300 illustrating a real-time mode of a generative response engine in accordance with some aspects of the disclosure. In particular, swimlane diagram 300 illustrates input of content at client device 302 (e.g., client device 202 in FIG. 2) that provides audio and image frames to cloud computing service 304 (e.g., cloud computing service 204 in FIG. 2), which in turn provides the audio and image frames to generative response engine 306 (e.g., generative response engine 206 of FIG. 2).

For example, swimlane diagram 300 illustrates that client device 302 receives three bursts of audio from 0.2 seconds to 0.43 seconds, 0.53 seconds to 0.67 seconds, and 0.97 seconds to 1.18 seconds. The bursts in FIG. 3A are provided for simplicity based on an audio frame rate of 10 Hz as speech generally consumes a longer duration.

Client device 302 is configured to convert the audio received at client device 302 into a stream of audio frames 311 to 325 and transmit audio frames 311 to 325 to cloud computing service 304. In some aspects, audio frames 311 to 325 are received at cloud computing service 304 based on an inherent delay associated with the audio frame rate and other delays (e.g., transmission to cloud computing service 304, which is not shown for simplicity).

In some aspects, cloud computing service 304 is configured to identify audio frames with speech content and stream the corresponding audio frames to generative response engine 306. In addition, cloud computing service 304 is configured to identify speech instance 330 during which the audio frames are streamed to generative response engine 306. For example, audio frames 313-322 correspond to the speech instance and are provided at client device 302 while the speech instance at client device 302 continues. In some aspects, generative response engine 306 may be provided frames that include speech. For example, audio frames 311, 312, 318, 319, and 323-325 are classified as no speech and may not provided to response engine 306 in some cases.

For purposes of illustration only, audio frame 322 includes information indicating the previous audio frames include an independent clause that corresponds to a complete concept and indicates that generative response engine 306 can use audio frames 313-322 for inference at generative response engine 306.

In addition, cloud computing service 304 may receive user video frames (or images) at a low resolution from client device 302. For example, client device 302 can provide video frames 326, 327, and 328 from a camera integral to client device 302 or an external image sensor coupled to client device 302. As noted above, the video frames (or images) are provided at a lower frame rate. Images generate a significant volume of tokens and too many images can overload the context and force compression and other mechanisms to reduce context size, which detrimentally affects performance. In some aspects, cloud computing service 304 (e.g., the keyframe detection engine 228 in FIG. 2) may provide keyframes based on a minimum framerate and/or select keyframes from the video frames that include content that includes features pertinent to inference and provide the keyframes to generative response engine 306. For example, video frames 326 and 328 are selected for purposes of illustration and video frame 327 is not provided to generative response engine 306. In some aspects, keyframes can be selected that are not within speech instance 330. For example, video frame 326 is captured before speech instance 330, or during silence of the speech instance 330. For example, a user may be speaking and may pause to provide a user input to select a forward facing camera to annotate some aspect of the speech. In this way, the video frames can be captured separately from the audio, such as when a user provides an identification of a specific feature that is separate from speech instance 330.

In some aspects, generative response engine 306 is configured to tokenize audio frames 313-322 and provide the tokens to the transformer engine of generative response engine 306 to generate a response. The generative response engine 306 can use the video frames 326 and 328 to provide additional content, such as identification of content, generative content (e.g., supplementing video frame 326, etc.) based on the audio frames provided to the generative response engine 306. Tokenization of audio and video can occur at any device illustrated in FIG. 3A or may be another component not illustrated (e.g., an encoder).

In some aspects, audio frames 313-322 and video frames 326 and 328 are provided to a buffer (not shown) associated with generative response engine 306. In some cases, the buffer temporarily stores the associated data (e.g., audio frames 313-322 and video frames 326 and 328) until a speech instance is detected, and then a signal from cloud computing service 304 triggers moving contents from the buffer to generative response engine 306, reducing latency and ensuring generative response engine 306 latency between end of speech detection and beginning of inference is minimized. In some cases, generative response engine 306 can trigger inference early. For example, in response to receiving an indication of the speech instance included in audio frame 322, generative response engine 306 performs inference based on the combination of audio frames 313-322 and video frames 326 and 328. In some cases, generative response engine 306 may have processed a portion of the tokens during pre-flighting and cached the tokens after an instruction to cancel. Generative response engine 306 can reactivate the cached tokens at higher layers while providing tokens associated with the uncached audio into lower layers of generative response engine 306. The reactivation of the cached tokens reduces the time delay between the end of the speech instance and the output of synthesized speech frames 341 and 342.

In some aspects, the pre-flighting of audio frames while using a classifier to identify speech instances identifies when speech ends with higher fidelity, with less latency, and enables intelligent pre-flighting to reduce delays between the end of the speech and the beginning of the response, providing a higher fidelity user experience. The natural detection of pauses in user speech does not require the user to use any audio cues to maintain the speech instance, creating a more immersive user experience.

Figure 3B:
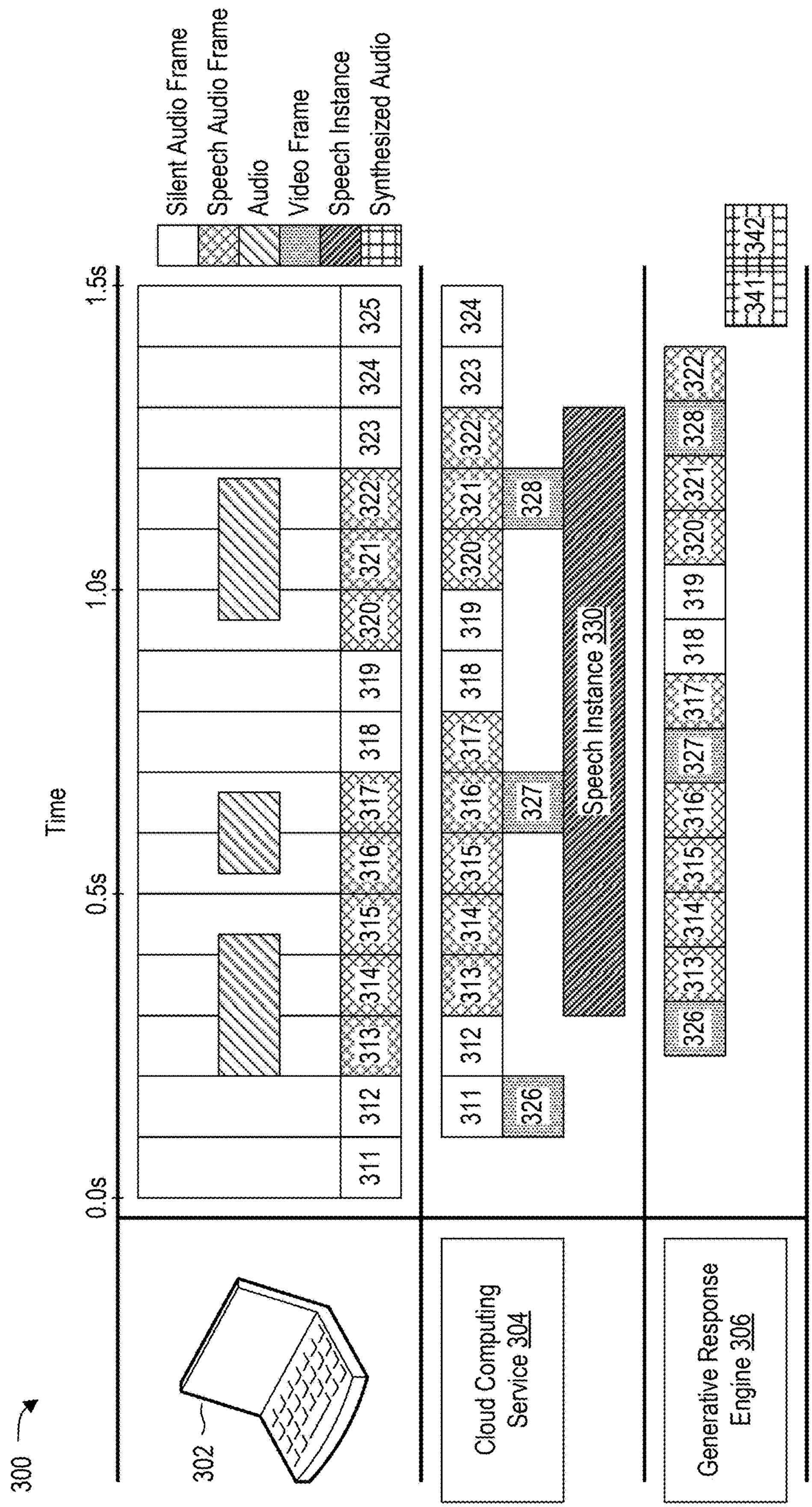
FIG. 3B is another swimlane diagram illustrating a real-time mode of a generative response engine in accordance with some aspects of the disclosure.

FIG. 3B is another swimlane diagram illustrating a real-time mode of a generative response engine in accordance with some aspects of the disclosure. In some aspects, the user video frames (or images) may provide audio and video content to generative response engine 306 as received by the client device 602. For example, video frame 326 is provided before audio frame 313 beginning the speech instance, and video frame 327 is juxtaposed between audio frames 316 and 317. In this aspect, generative response engine 306 can use additional context associated with client device 302 can provide video frames 327 when generating a response. For example, synthesized speech frames 341 and 342 can change tonality of speech based on additional context provide by video frames 327, 327, and 328.

Figure 4:
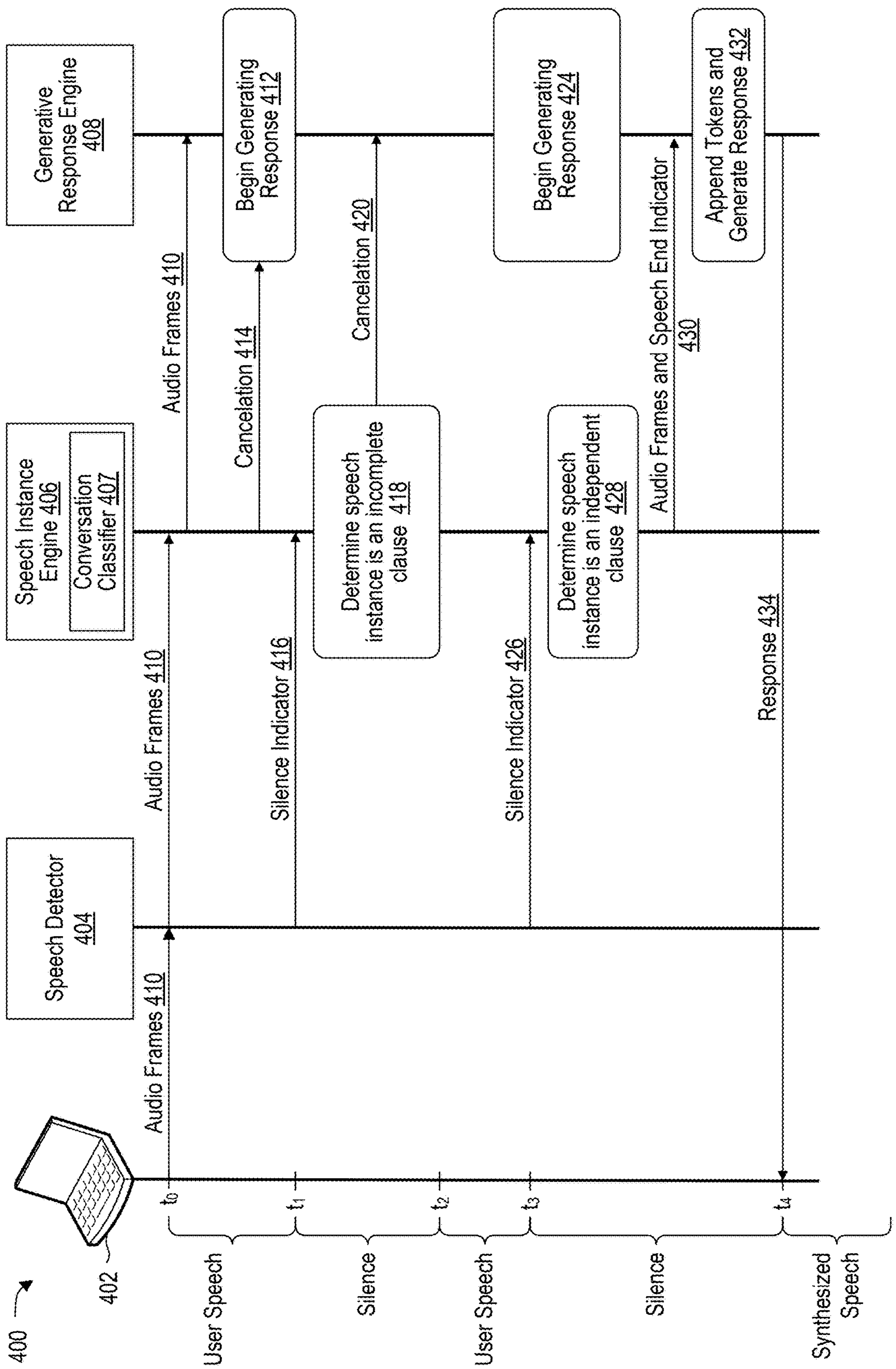
FIG. 4 is a sequence diagram illustrating a real-time mode associated with a generative response engine in accordance with some aspects of the disclosure.

FIG. 4 is a sequence diagram illustrating a real-time mode associated with a system 400 including a generative response engine in accordance with some aspects of the disclosure. In some aspects, system 400 includes client device 402 (e.g., client device 302 of FIG. 3A, etc.), speech detector 404, speech instance engine 406 (e.g., speech instance engine 224 of FIG. 2) including a conversation classifier 407 (e.g., conversation classifier 222 of FIG. 2), and generative response engine 408.

In some aspects, client device 402 is associated with a user and is configured to receive audio and video and transmit the audio to a cloud computing service (e.g., cloud computing service 304 in FIG. 3A), which is not shown. In some aspects, and as noted above, a cloud computing service (e.g., cloud computing service 304) or client device 402 may include speech detector 404. In some cases, conversation classifier 407 may be included in a client device 402. For example, a native client application (e.g., downloaded and installed on client device 402) can include or may retrieve conversation classifier 407 using a network connection if client device 402 has sufficient resources to perform inference.

Client device 402 is configured to receive audio (e.g., user speech) and provide audio as audio frames 410 to speech detector 404, speech instance engine 406, and generative response engine 408 based on the architecture of system 400. For example, a speech instance engine 406 (e.g., speech instance engine 224 in FIG. 2) may control the streaming of audio frames 410 to generative response engine 408. Audio frames 410 may include audio in various forms, such as audio tokens or sampled audio. For example, an encoder (not shown) may encode audio samples into audio tokens and the audio tokens are included in audio frames 410. In some aspects, audio frames 410 are continually provided during the user speech and silence periods illustrated in FIG. 4.

In some aspects, generative response engine 408 is configured to begin preparing the response to audio frames 410 while user speech is being provided. At block 412, the length of the audio is not known and generative response engine 408 attempts to frontload processing as much as possible. The context of audio may change, and speech instance engine 406 may send a cancelation signal 414 to generative response engine 408 to cancel inference based on the current accumulated frames at generative response engine 408.

Speech detector 404 is configured to classify audio frames 410 as speech or not speech when received from client device 402. For example, speech detector 404 may detect a frame that does not contain speech and may send silence indicator 416 to speech instance engine 406. In some aspects, at block 418, in response to silence indicator 416, conversation classifier 407 uses audio frames 410 and determines that audio frames 410 are deemed to be an incomplete clause. For example, the classification of the conversation in audio frames 410 indicates that more speech input is expected. For example, as part of block 418, speech instance engine 406 may send a cancelation signal 420 to generative response engine 408. To reduce processing, speech instance engine 406 may not send audio frames 410 that are deemed silent to generative response engine 408 (e.g., audio frames associated with the silent period between time $t_1$ and $t_2$).

In some aspects, user speech resumes at time $t_2$, and speech instance engine 406 continues providing audio frames 410 to generative response engine 408, which begins generating a response at block 424 by processing audio tokens associated with audio frames 410. Silence is detected at time $t_3$, and speech detector 404 sends silence indicator 426 to speech instance engine 406. In response to speech detector 404 sending silence indicator 426, conversation classifier 407 determines that speech in audio frames 410 corresponds to an independent clause at block 428. Based on the detection of the independent clause, speech instance engine 406 sends any remaining audio frames 410 and speech end indicator 430 to generative response engine 408.

In some aspects, at block 432, generative response engine 408 appends tokens from the remaining audio frames and continues generating the response based on combined audio frames 410. In some aspects, because inference begins at block 424 (e.g., after block 418), generative response engine 408 has preprocessed some tokens and can reduce the inference time. For example, generative response engine 408 can process audio frames multiple times and may discard processing based on cancelation signals (e.g., cancelation signal 414, cancelation signal 420) from speech instance engine 406. In some aspects, generative response engine 408 can also cache activated tokens at different layers of a transformer model to efficiently process audio tokens.

At time $t_4$, generative response engine 408 provides response 434 to client device 402 including audio tokens or suitable audio content for presenting a synthesized speech at client device 402. Because generative response engine 408 begins inference again at block 412, the delay between time $t_3$ and $t_4$ is reduced and latency between the end of user speech at time $t_3$ and beginning of presenting synthesized speech at time $t_4$ is reduced by several hundred milliseconds. Reducing the delay between time $t_3$ and $t_4$ improves the user experience because the response duration is natural and more accurately simulates human conversation.

In some aspects, speech instance engine 406 may also detect an end to a speech instance based on a maximum duration for waiting for additional audio. The maximum duration is generally a longer period that is long enough that a response is expected and presumes the user's inquiry has ended. For example, a maximum duration of 15 seconds would be too long, and a maximum duration of 2 seconds would be too short.

Figure 5:
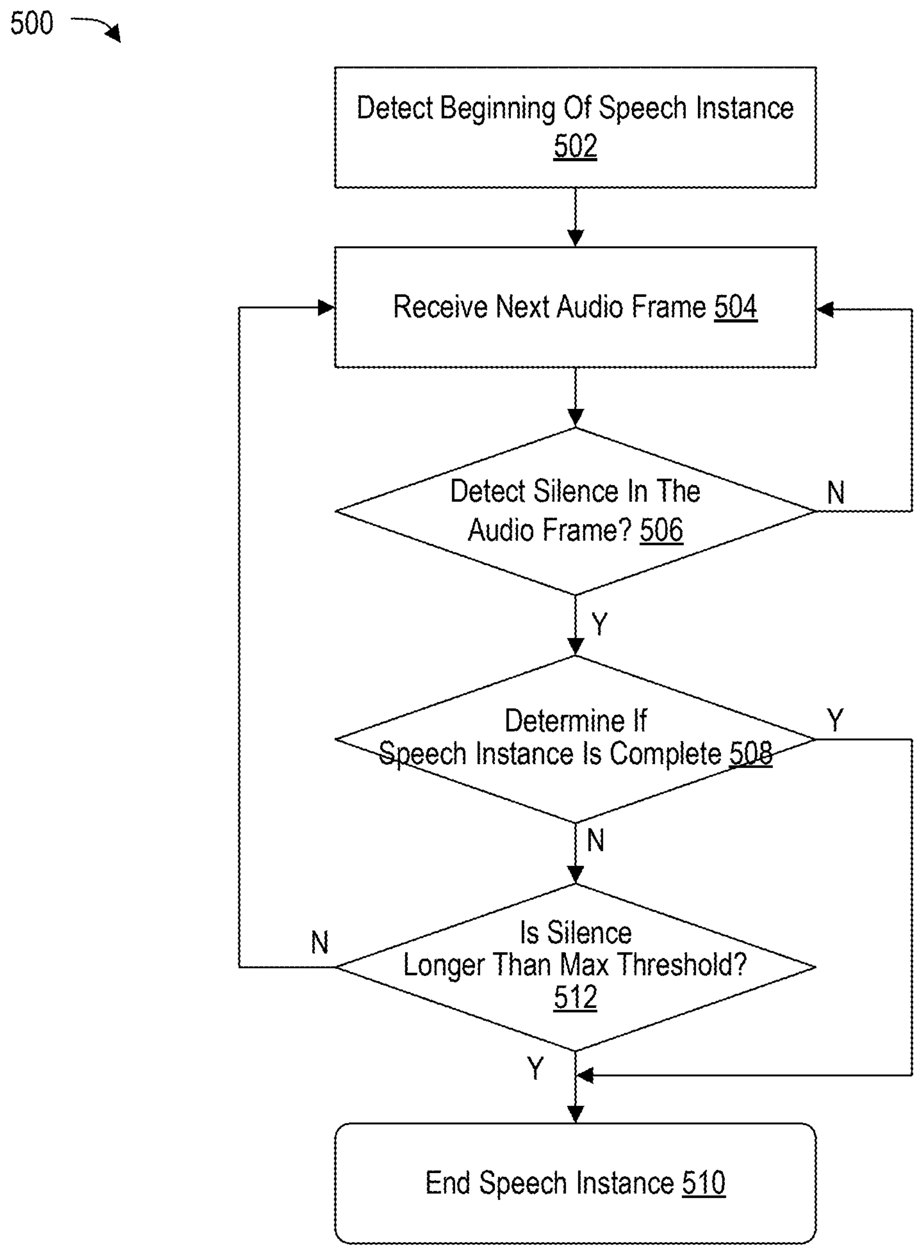
FIG. 5 is a flow diagram of a process for detecting an end of a speech instance in accordance with some aspects of the disclosure.

FIG. 5 is a flow diagram of a process 500 for detecting speech instances in accordance with some aspects of the disclosure. In some aspects, process 500 is performed by a speech instance engine (e.g., speech instance engine 406 in FIG. 4, etc.) in conjunction with a speech detector (e.g., speech detector 404 in FIG. 4, etc.) and a conversation classifier (e.g., conversation classifier 407 in FIG. 4, etc.).

At block 502, the speech instance engine detects beginning of a speech instance in an audio frame. For example, a speech detector provides a signal indicating that a frame includes speech.

At block 504, the speech instance engine receives the next audio frame. At block 506, the speech instance engine determines if the audio frame comprises silence. For example, the speech detector provides a signal indicating that a frame does not include speech. When silence is detected at block 508, the speech instance engine proceeds to block 508. If silence is not detected at block 506, the speech instance engine returns to block 504 to receive the next audio frame.

At block 508, the speech instance engine determines if the current audio frames in the current speech instance correspond to an independent clause. For example, the speech instance engine provides the audio frames including speech to a conversation classifier, which is configured to classify whether the speech in the audio frames forms an complete speech instance or that the speech instance is expected to continue. For example, the conversation classifier might classify a speech instance as completed or incomplete based on an independent clause or an incomplete clause terminating in a pause in speech. If the speech in the audio frames corresponds to an independent clause at block 508, the speech instance engine proceeds to block 510 and ends the current speech instance.

If the speech in the audio frames are not enough to predict that the speech instance has ended at block 508 (e.g., the audio frames correspond to an incomplete clause), the speech instance engine proceeds to block 512 to determine if a length of silence is longer than a maximum threshold. For example, if the audio frames comprise 100 milliseconds and the maximum threshold is 5 seconds, the speech instance engine determines whether the last 50 audio frames are silent.

If the silence is longer than the maximum threshold, the speech instance engine ends the current speech instance at block 510. If the silence is less than the maximum threshold, the speech instance engine returns to block 504 to receive the next audio frame.

Figure 6A:
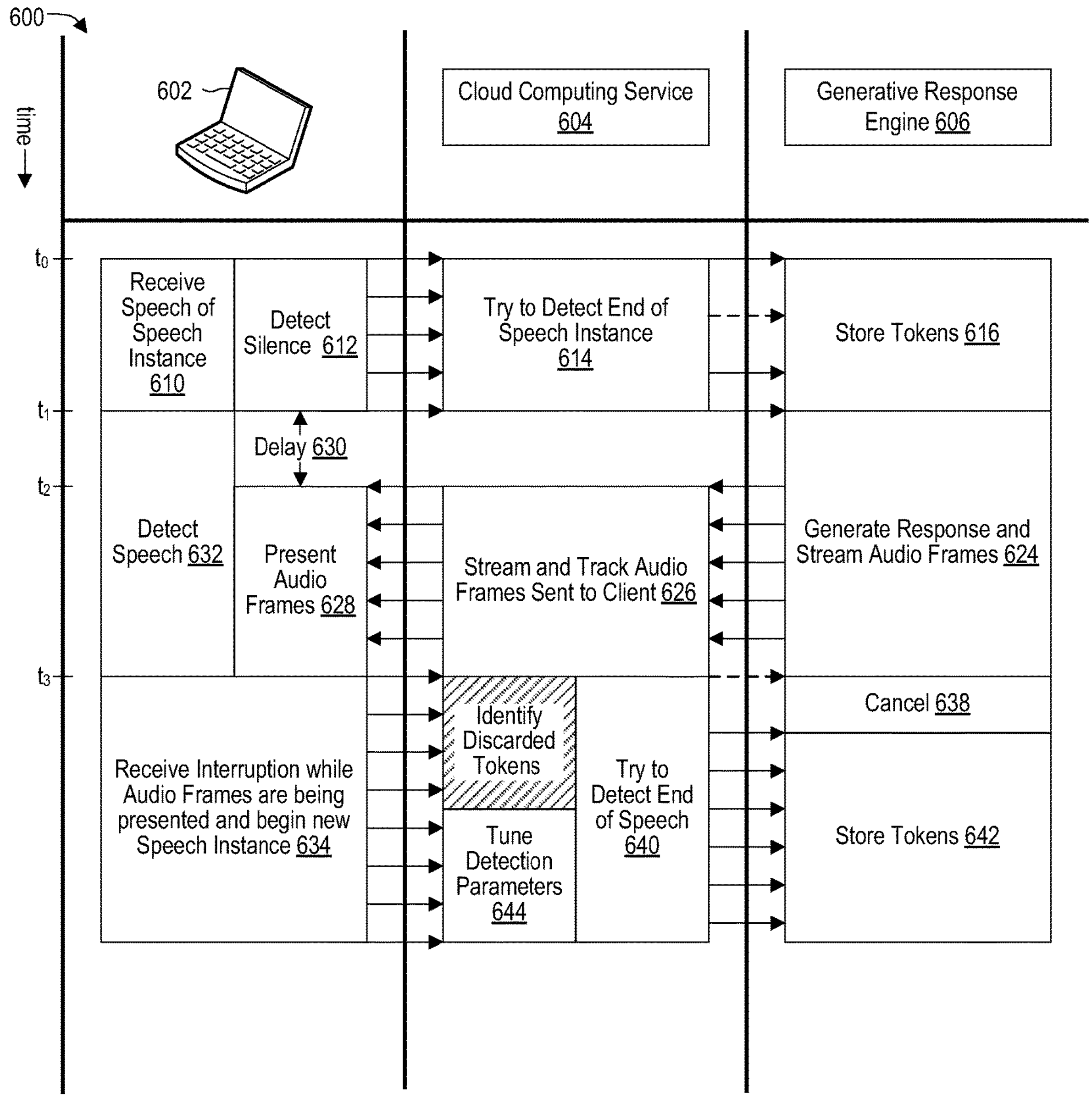
FIG. 6A is a swimlane diagram illustrating a real-time mode of a generative response engine and handling user interruptions in accordance with some aspects of the disclosure.

FIG. 6A is a swimlane diagram 600 illustrating a real-time mode of a generative response engine and handling user interruptions in accordance with some aspects of the disclosure. In some aspects, the system includes client device 602 (e.g., a laptop, a mobile phone) that executes an application (e.g., client application 212 in FIG. 2) in connection with cloud computing service 604 (e.g., cloud computing service 204 in FIG. 2, cloud computing service 304 in FIG. 3A, etc.) including a generative response engine 606 (e.g., generative response engine 110 in FIG. 1, generative response engine 206 in FIG. 2, etc.). FIG. 6A illustrates various states and activities of client device 602, cloud computing service 604, and generative response engine 606 over time along in Y axis. In some aspects, swimlane diagram 600 (and other sequence diagrams and swimlane diagrams) are not to scale and are merely illustrative of the concepts disclosed herein.

At block 610 and at time to, client device 602 begins receiving speech associated with a speech instance. At the same time, at block 612, client device 602 attempts to detect silence in the speech. In some aspects, client device 602 is configured to send the speech as audio frame (e.g., tokenized audio or raw audio) to cloud computing service 604.

At block 614, cloud computing service 604 is configured to try to detect an end of the speech instance and provide (e.g., transmit or stream) the audio frames to generative response engine 606. In some aspects, the cloud computing service 604 may pre-flight a response by providing the audio frames a buffer (not shown) associated with generative response engine 606 to minimize delay between end of speech instance detection and beginning of inference. For example, the buffer associated with generative response engine 606 may store the audio frames at block 616.

At time $t_1$, block 614 identifies an end to the current speech and remaining audio frames are provided to generative response engine 606 (e.g., a buffer). In some aspects, block 614 may also provide at least one video frame received from client device 602, and generative response engine 606 appends tokens associated with the at least one video frame to the accumulated tokens for inference. In other aspects, as described above, video frames can also be interleaved with audio frames. As detailed above, this process allows generative response engine 606 to begin processing the audio tokens before the end of the speech instance at time $t_1$ and generate a response associated with the accumulated audio tokens and any video tokens at block 624. The response may include any type of corresponding response, such as audio tokens, video tokens, or text tokens. For purposes of simplicity, the response is described below as including audio frames but can be any type of content generated by generative response engine 606.

Beginning at time $t_2$ and at block 624, generative response engine 606 may stream audio frames (e.g., output audio tokens) to cloud computing service 604 due to the asynchronous nature of generative response engine 606. In response to the audio frames, cloud computing service 604 may initiate a counter and stream audio frames to client device 602 at block 626. For example, Table 2 illustrates an example using a WebSocket client (socket) to count the number of 8 KB chunks sent to the client. In this example, the data in the global scope is a received stream (e.g., from generative response engine 606) and streams packets to client device 602 in 8 KB chunks for illustrative purposes. A timeout occurs after 5 seconds to stop the stream and then outputs the number of packets sent. In some aspects, Table 2 is an example and is not necessarily production code, but is illustrative of how an external counter can be used outside of the scope of a function for transmission, which occurs every time the socket.emit function.

TABLE 2

```
import axios from 'axios';
import { socket } from'./socket'
function startStream(clientid: string, data:Uint8array) {
  const cancelTokenSource = axios.CancelToken.source( );
  let index = 0;
  const chunkSize = 1024 * 8; // 8 KB
  // Initiate WebSocket Request
  if (index < data.length) {
    const chunk = data.slice(index, index + chunkSize);
    console.log('Sending chunk:', chunk);
    socket.emit('data', chunk);
    index += chunkSize;
  } else {
    stopStream( );
  }
  socket.on(' connect', ( ) => {
    console.log('WebSocket connected');
  });
  socket.on('disconnect', ( ) => {
    console.log('WebSocket disconnected');
    stopStream( );
  });
  function stopStream( ) {
    clearInterval(interval);
    socket.disconnect( );
    cancelTokenSource.cancel ('Stream cancelled');
    console.log('Stream stopped');
    console.log(stream.counter) //outputs the number of 8 KB packets
sent
  }
  return { stopStream, cancelToken: cancelTokenSource.token };
}
let handleMessage = ( ) = { };
let stream = startStream (data) //assume data is a receive stream
setInterval(( ) => {stream.stopStream( )}, 5000} //5s timeout
```

In some aspects, at time $t_2$, client device 602 may receive and present the audio frames at block 628. In this case, the pre-flighting, as well as speech instance detection (e.g., at block 614) causes generative response engine 606 to reduce the delay between the detection of silence at time $t_1$ and the presentation of audio frame at time $t_2$. For example, the delay 630 may be approximately 300 milliseconds, which corresponds to a natural delay of a human conversation and accurately simulates real-time behavior.

In some aspects, client device 602 is configured to switch to detecting speech at block 632 in response to the identification of the end of the speech instance. In some cases, the client device 602 is generally configured to detect speech or lack of speech during runtime of the application, and the detection of speech at block 632 identifies a state of the application because there is no current speech instance after time $t_1$.

In some aspects, at time $t_3$ which corresponds to the start of block 634, client device 602 begins to receive an interruption while audio frames are being presented. For example, client device 602 may be outputting audio frames when a user begins to speak over the audio frames being presented. Although FIG. 6A shows audio frames and interruption as distinct times, the audio frames being output at client device 602 and audio being received and converted into audio frames overlaps in time. For example, the audio frames being presented at block 628 may be deemed incorrect by the user due to an ambiguity or a possible error in the initial speech instance.

In this case, at block 634, client device 602 begins sending audio frames associated with a second speech instance to cloud computing service 604. In some cases, client device 602 may also send a signal, either with the audio frames or before, with a value indicating that user speech is detected. The audio frames and/or the signal indicate that a new speech instance is detected at cloud computing service 604. For example, based on the new speech instance, cloud computing service 604 begins to try to detect an end of speech instance at block 640 (e.g., corresponding to block 614).

As described above, cloud computing service 604 is configured to track audio frames transmitted to client device 602. In response to detecting the interruption, cloud computing service 604 identifies audio frames and/or audio tokens presented at client device 602. In one example, cloud computing service 604 can use the audio frames transmitted via the transmission function (e.g., as shown in Table 2) to identify audio tokens presented. Generally, application state at client device 602 is not linked to state at cloud computing service 604 to simplify the coordination of services. In some cases, client device 602 may send a report back identifying information corresponding to a last token presented at client device 602.

In some aspects, cloud computing service 604 is configured to send an inference cancellation signal to generative response engine 606. For example, at block 638, generative response engine 606 receives the signal and cancels inference. In addition, cloud computing service 604 discards any audio tokens corresponding to audio that is not presented at client device 602, including tokens in any cache. Generally, tokens may be stored within a context window to ensure that future responses are contextually accurate. However, as audio tokens were interrupted and not presented, audio tokens may be dropped that were not presented based on information corresponding to the last token presented at client device 602. In some cases, generative response engine 606 may drop all audio tokens associated with the response beginning at block 624.

Based on the audio frames from client device 602, cloud computing service 604 is configured to provide audio frames (e.g., audio tokens) to generative response engine 606. For example, generative response engine 606 can process audio tokens at block 642 in connection with reducing delays between beginning of output in connection with speech content associated with the second speech instance associated with the interruption at time $t_3$.

In some aspects, cloud computing service 644 configured to tune detection parameters associated with the speech. For example, cloud computing service 604 may control an audio or speech detection, such as selecting a different algorithm to encode the speech into tokens. In some cases, cloud computing service 604 may also send information to client device 602 identifying a different microphone processing to, for example, remove feedback received at a microphone of client device 602, pre-process audio (e.g., apply gain, filter audio, etc.) or tokenize audio at client device 602, etc.

Figure 6B:
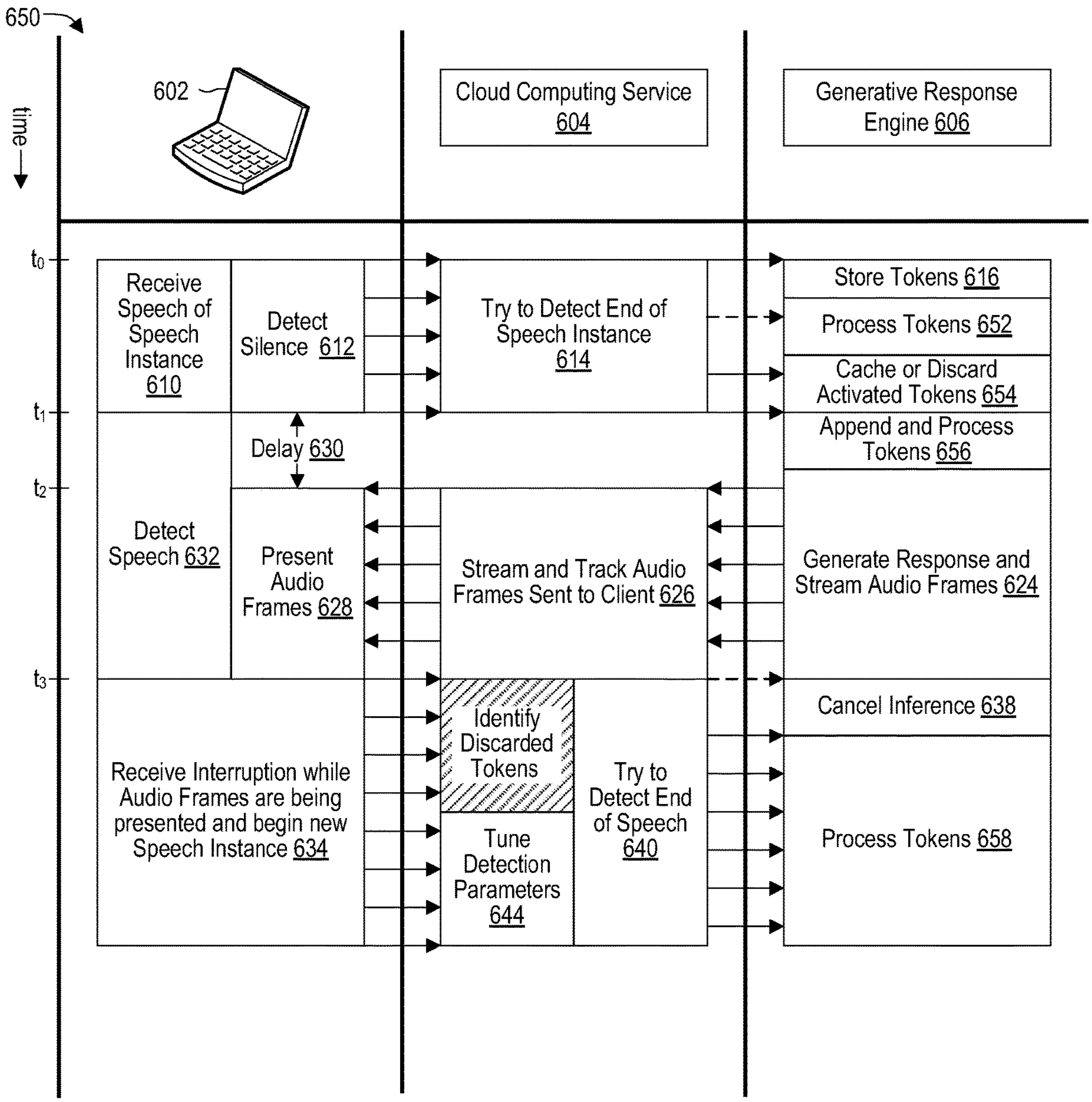
FIG. 6B is another swimlane diagram illustrating a real-time mode of a generative response engine and handling user interruptions in accordance with some aspects of the disclosure

FIG. 6B is another swimlane diagram 650 illustrating a real-time mode of a generative response engine and handling user interruptions in accordance with some aspects of the disclosure. In some aspects, the system includes client device 602 (e.g., a laptop, a mobile phone) that executes an application (e.g., client application 212 in FIG. 2) in connection with cloud computing service 604 (e.g., cloud computing service 204 in FIG. 2, cloud computing service 304 in FIG. 3A, etc.) including a generative response engine 606 (e.g., generative response engine 110 in FIG. 1, generative response engine 206 in FIG. 2, etc.). FIG. 6B illustrates various states and activities of client device 602, cloud computing service 604, and generative response engine 606 over time along in Y axis. In some aspects, swimlane diagram 600 (and other sequence diagrams and swimlane diagrams) are not to scale and are merely illustrative of the concepts disclosed herein.

The swimlane diagram 650 is similar to swimlane diagram 600 and repeated portions will be omitted. In FIG. 6B, generative response engine 606 is configured to process tokens in parallel with receiving tokens at cloud computing service 604. For example, cloud computing service 604 may provide tokens to generative response engine 606 for buffering at block 616 while performing inference associated with another task. In some aspects, the generative response engine 606 may become available and may begin to process audio tokens associated with the audio frame using a transformer model at block 652. While processing the tokens using the transformer model of generative response engine 606, cloud computing service 604 may send cancelation signal (e.g., cancelation signal 414 in FIG. 4) to instruct generative response engine 606 to stop processing the audio tokens. The cancellation signal is provided at various stages by cloud computing service 604 to indicate to generative response engine 606 that the context has significantly shifted. For example, cloud computing service 604 may have received additional audio frames with additional tokens that may have changed the context. At block 654, generative response engine 606 cancels inference with the tokens and may cache or discard activated and processed tokens based on the cancelation signal. In this case, cloud computing service 604 may continue to receive the audio frames from client device 602, which continues to identify an end of the speech instance during block 614 while providing additional audio frames to generative response engine 606. After caching or discarding activated tokens at block 654, after an end of speech instance is detected, generative response engine 606 appends tokens to prior tokens and processes the accumulated tokens at block 656 in connection with pre-flighting a response to reduce delays.

In some aspects, at block 638, an interruption is configured to cancel inference due to speech provided at client device 602. In this case, generative response engine 606 is configured to store and then process tokens at block 658 similar to the first speech instance detection.

Figure 7:
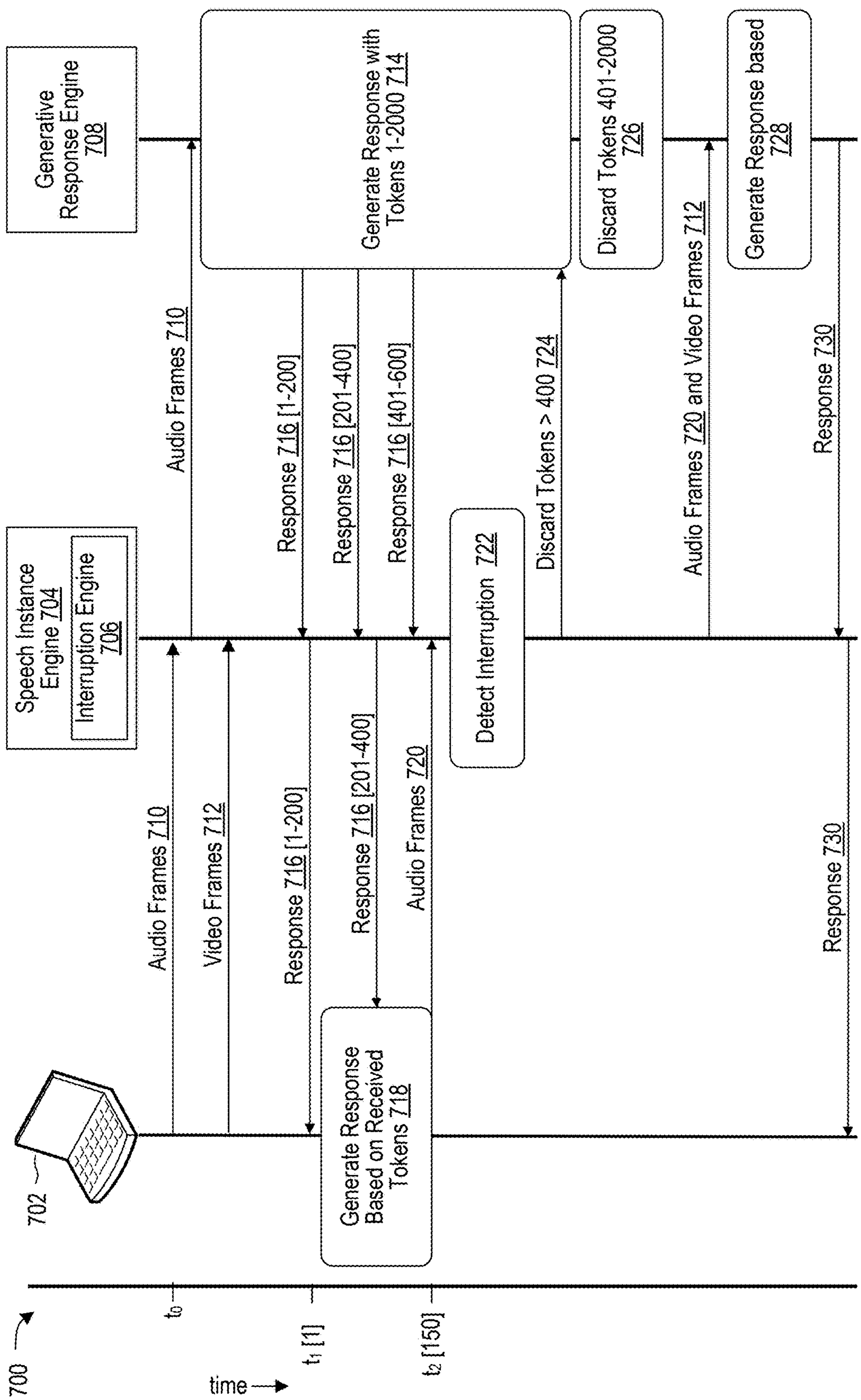
FIG. 7 is a sequence diagram illustrating a real-time mode of a generative response engine and handling user interruptions in accordance with some aspects of the disclosure.

FIG. 7 is a sequence diagram 700 illustrating a real-time mode of a generative response engine and handling user interruptions in accordance with some aspects of the disclosure. In some aspects, the system includes client device 702 (e.g., the client device 602 in FIG. 6A, etc.), speech instance engine 704 (e.g., speech instance engine 224 in FIG. 4) including an interruption engine 706 (e.g., interruption detection engine 226 in FIG. 2), and generative response engine 708 (e.g., generative response engine 110 in FIG. 1, generative response engine 206 in FIG. 2, etc.).

At time to, client device 702 begins receiving speech from a user (e.g., a user speaking into a microphone) and sending audio frames 710 associated with speech instance engine 704. In some cases, client device 702 may tokenize the audio frames using an encoder. In other cases, speech instance engine 704 or generative response engine 708 can include an encoder for tokenizing audio in the audio frames and replacing raw audio with tokens. In either case, speech instance engine 704 sends audio frames 710 to generative response engine 708.

In some aspects, after time to, client device 702 may also send video frames 712 to speech instance engine 704. At block 714, generative response engine 708 is configured to generate a response including tokens 1-2000. In this case, generative response engine 708 processes audio frames 710 and generates a response based on various processing, such as activating different layers of a transformer engine, performing safety checks, etc. Due to the duration associated with the response at block 714, generative response engine 708 may begin asynchronously streaming frames in a plurality of responses 716 that include different tokens or audio associated with tokens. For example, the response 716 may include 200 distinct tokens that are sequential due to the time-domain nature of the response. In some cases, speech instance engine 704 is configured to receive responses 716 and forward responses 716 to client device 702.

For example, at time $t_1$, client device 702 receives response 716 including tokens 1-200, and begins generating a response based on the received tokens at block 718. In this example, before time $t_2$, which corresponds to a time at which token 150 will be output to a user of client device 702, a response 716 is received by client device 702 including tokens 201-400, but has not received tokens 401-600, which speech instance engine 704 has received.

At time $t_2$, corresponding to token 150, client device 702 detects speech and provides audio frames 720 to speech instance engine 704. Although FIG. 7 illustrates audio frames are provided to speech instance engine 704 based on detected speech, client device 702 may continue to send frames associated with audio, such as audio frames that are empty and include a Boolean indicator whether speech was detected (e.g., using speech detector 216).

At block 722, speech instance engine 704 detects an interruption and is configured to discard all associated audio frames and/or tokens from the response associated with block 714. In addition, speech instance engine 704 sends a discard message 724 to generative response engine 708 identifying the most recent token provided to client device 702 or output by client device 702. For example, speech instance engine 704 identifies tokens based on the transmitted frames and generative response engine 708 discards tokens greater than 400(block 726). In this case, generative response engine 708 is configured to cancel inference based on audio frames 710 and discard tokens that were generated and not presented to client device 702. In this way, tokens that were not output by client device 702 are discarded from the context window and any subsequent response should not take into account the full details associated with the response.

In addition, speech instance engine 704 begins sending audio frames 720 associated with a second speech instance (associated with the interruption). In addition, if the speech instance is completed, speech instance engine 704 may also send video frames 712. For example, a video frame that is captured before the interruption can be sent to generative response engine 708 to assist in forming a second response based on the interruption.

At block 728, generative response engine 708 generates and sends response 730 to client device 702 via speech instance engine 704.

In this example, speech instance engine 704 is configured to add video frames (e.g., video tokens) after audio frames to provide additional context for generative response engine 708. The video frames are selected by speech instance engine 704 based on various features. One non-limiting example of a feature may be a video image captured before the audio was interrupted, which can provide additional context as to why the response was interrupted for generative response engine 708.

Figure 8A:
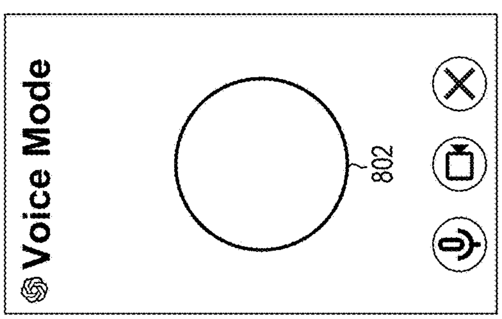
FIGS. 8A-8F illustrate various illustrations of an application executing on a client device in accordance with some aspects of the disclosure.

FIGS. 8A-8F illustrate various illustrations of an application executing on a client device at different times in accordance with some aspects of the disclosure. In some aspects, FIG. 8A illustrates an application that executes on a client device (e.g., client device 202 in FIG. 2) such as a mobile phone or a laptop using a remote service (e.g., cloud computing service 204 and generative response engine 206). The application is configured in a voice mode and illustrates an emblem 802 that represents a state associated with the application. In FIG. 8A, the emblem is empty because the application is waiting for input or the application is initializing for a real-time voice mode.

Figure 8B:
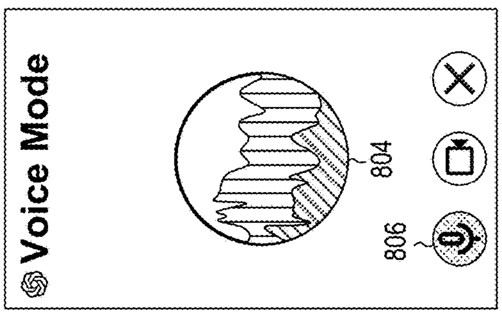

FIG. 8B illustrates a different state of the application and includes a voice input emblem 804 based on when user input is being provided at the application. The application also illustrates a microphone icon 806 indicating that the voice mode is active. In this case, the user may be verbally providing a prompt into the application. Client device 202 can receive the audio prompt. Responsive to receiving the voice prompt, voice input emblem 804 can react to the received audio prompt to give an indication to the user that their voice input is being received. For example, a cloud or wave animation can provide a time-domain representation or a frequency-domain representation, and/or the size of the voice input emblem can pulse according to the amplitude of the audio prompt. In some aspects, the application can detect and begin sending audio frames of the user speech to a cloud computing service that includes a generative response engine.

Figure 8C:
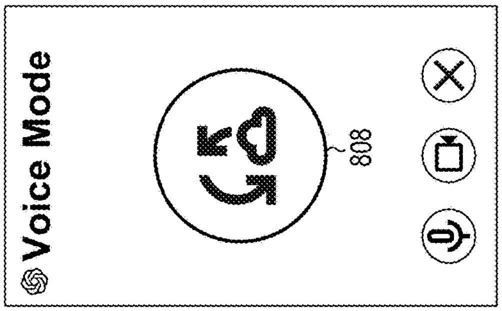

FIG. 8C illustrates a state of the application based on completion of the speech input and shows a processing emblem 808. In some aspects, processing emblem 808 may be displayed by the application when the cloud computing service determines an end of speech instance. For example, when the audio frames provided to cloud computing service correspond to an independent clause, the cloud computing service can provide a signal to the client device indicating that the generative response engine is generating a response.

In this way, the processing emblem 808 provides a visual feedback mechanism that indicates that speech is being processed. In some case, the client device may also or alternatively output an audio cue (e.g., a distinct beep or distinct audible sequence) in response to the signal. In some embodiments, rather than change the emblem, text or an animation might be used to show that inference operations or tool calls are in progress. Feedback that the generative response engine considers the speech a complete input provides the user with intuitive understanding that a response is expected. In addition, the feedback also indicates that the user can provide an interruption to cancel the inference task. Generally, due to the innovations addressed in the present disclosure, the interval between the end of user speech and the start of the synthetic speech is short, and no visual indication that inference operations are occurring is needed. Even if the processing emblem, or the like, is not displayed, the application can still communicate with the cloud computing service to indicate that no voice is detected in the speech.

Figure 8D:
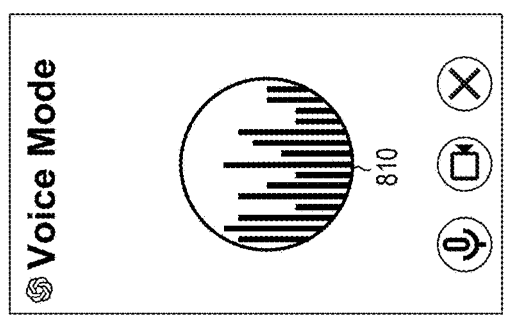

FIG. 8D illustrates a state of the application based on audio being presented to the user at the client application. In this case, an output emblem 810 is configured to display dynamic images based on the synthesized speech. In some aspects, the output emblem 810 may display a complex graphic that represents that the application is in an output mode, such as an abstract image similar to a cloud or waveform, similar to that in FIG. 8B. In the example of FIG. 8D, the output emblem 810 corresponds to a time-domain representation or a frequency-domain representation of the synthesized speech audio or a frequency domain. The size of output emblem 810 can also pulse to correspond with the amplitude of the waveforms in the synthesized speech. The animation of the output emblem 810 can be in response or in association with the playing of the synthesized speech output by client device 202.

Figure 8E:
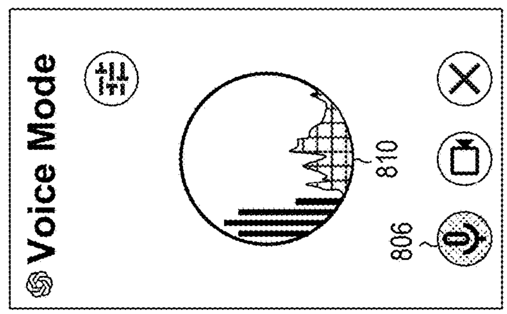

FIG. 8E illustrates a state of the application based on an interruption being presented by the user at the client application. In this case, the output emblem 810 displays a mixed representation of the synthesized speech illustrated by the time-domain representation or a frequency-domain representation of the synthesized speech audio and a time-domain representation or a frequency-domain representation of the user audio. In this case, the slightly different variations of the displays in the audio emblem 810 identify the different states of audio at the client device.

Figure 8F:
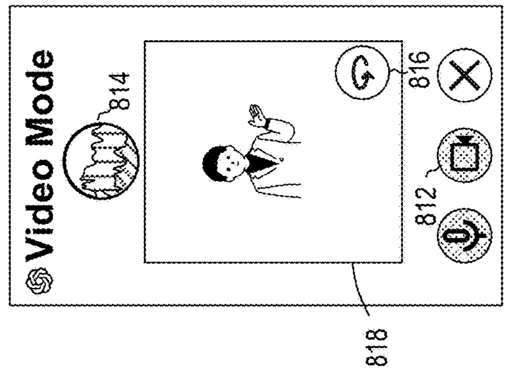

While FIG. 8B, FIG. 8C, FIG. 8D, and FIG. 8E show distinct differences to represent state changes in the application, these representations might be more subtle in operation. In one example, voice input emblem 804 and output emblem 810 can be the same emblem. During voice input states, the time-domain representation or a frequency-domain representation within the emblem might be less active or not active at all, but the size of voice input emblem 804 can pulse to represent the amplitude of the audio received by the application. During synthesized voice output states, the time-domain representation or a frequency-domain representation within the emblem might be active to track characteristics of the synthesized voice, and output emblem 810 can pulse to represent the amplitude of the audio played by the application. FIG. 8F illustrates the application during a video mode for real-time interaction in accordance with some aspects of the disclosure. In this case, a video function has been engaged based on a video icon 812 to enable the capturing of video. The application in this case displays an emblem 814 for voice input and output states, and video preview frame 818 to facilitate input of video using a camera and image sensor. For example, the video preview frame 818 may include a viewfinder to allow a user to preview the captured video. In some cases, the user may want to select a different image sensor, such as a forward-facing camera or rear-facing camera, using a camera select 816 icon to allow a different type of input into the generative response engine.

Figure 9:
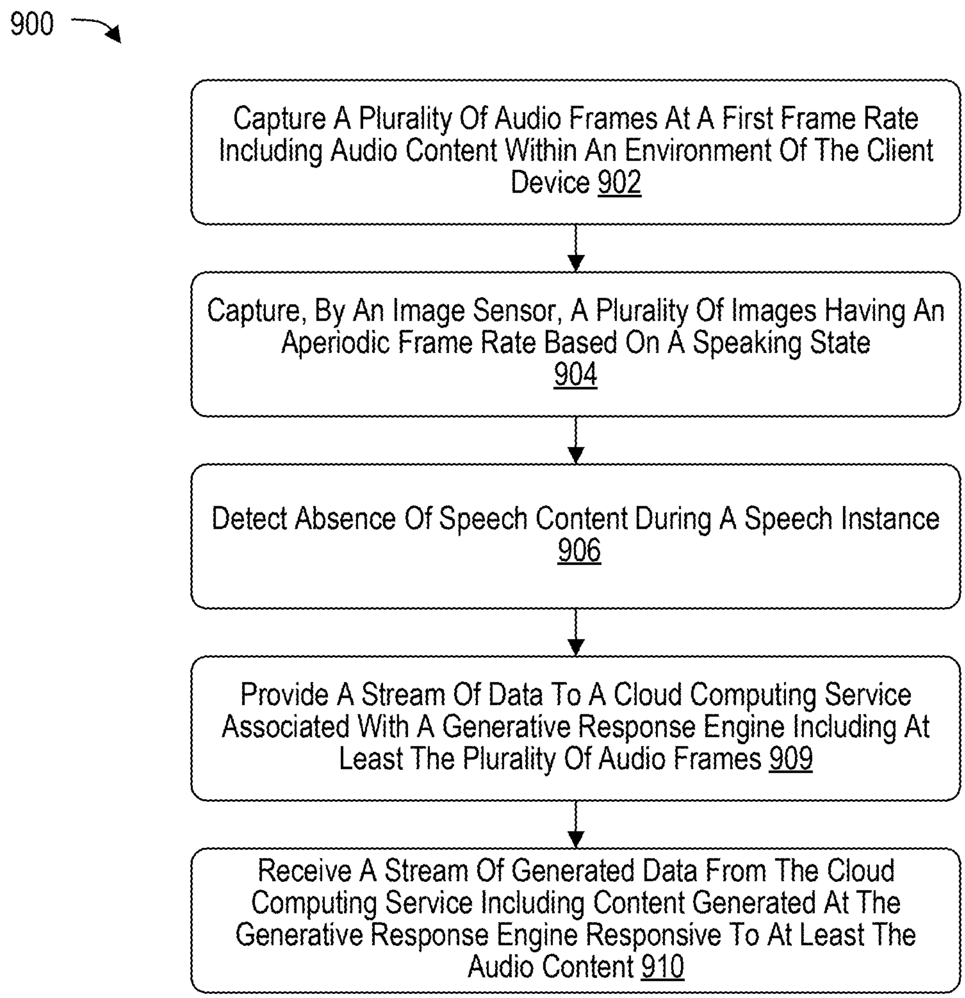
FIG. 9 is a flow diagram of a process for detecting an end of a speech state for a user speech instance in accordance with some aspects of the disclosure.

FIG. 9 is a flow diagram of a process 900 for detecting an end of a speech state for a user speech instance in accordance with some aspects of the disclosure. The process 900 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAS, programmable logic devices, discrete gates or transistor logic components, discrete hardware components, etc., an ML system such as a neural network model, any combination thereof, and/or other component or system) of the computing device. The operations of process 900 may be implemented as software components that are executed and run on one or more processors (e.g., CPU, GPU, DSP, NPU or neural engine, SoC, processor 1404 of FIG. 14, and/or other processor(s)). In some aspects, a client device (e.g., client device 202 in FIG. 2) may connect to a cloud computing service (e.g., cloud computing service 204 in FIG. 2) including a generative response engine (e.g., generative response engine 206 in FIG. 2) to execute various tasks.

At block 902, the client device may capture a plurality of audio frames at a first frame rate, the plurality of audio frames including audio content within an environment of the client device. For example, the client device may be executing an application that allows real-time voice interaction (e.g., voice mode) with a generative response engine. In one illustrative example, a first frame rate is 10 frames per second or substantially equal to 10 frames per second (e.g., 10.05 frames per second). For example, substantially equal or approximate in this example means nearly or approximately equal, allowing for minor differences that do not materially affect the overall equivalence.

At block 904, the client device may capture, by an image sensor associated with the client device, a plurality of images having an variable frame rate based on a speaking state. In some cases, the client device can also provide variable video frames based on whether the user is deemed to be speaking in a speech instance. For example, the video frame rate may be substantially equal to 1 frame per second during a non-speech instance, and substantially equal to 3 frames per second during a speech instance. In some examples, the client device can capture the plurality of images at a periodic frame rate common in video capture (e.g., 30 fps, 60 fps, etc.), but the keyframes (e.g., selected by the cloud computing service) that are sent to the cloud computing service are at the variable frame rate. For example, during a voice input mode, the client device may capture a very low frame rate (e.g., 1 fps) and the cloud computing service may send a portion of the frames at 0.2 fps because the end of the speech instance occurs at an unknown time in the future. In some cases, the cloud computing service may provide the keyframes after the audio frames. In some aspects, the keyframes may not include positional or time embeddings and the generative response engine, based on limiting the keyframes, may correctly associate features from the keyframes with the audio frames.

In some aspects, the cloud computing service is configured to receive the audio frames and transmit the plurality of audio frames during a speech instance of a user to the generative response engine. In some aspects, the cloud computing service provides video frames to the generative response engine at an aperiodic rate. For example, video frames may not be transmitted until the speech instance is completed, which allows the video frames to be provided for inference after audio. The cloud computing service is configured to drop images based on the speaking state of a user and activity detected in the images. For example, the cloud computing service is configured to limit the video frames provided to the generative response engine to prevent overloading the context. For example, cloud computing service can determine an optical flow between two video frames that illustrate the volumes of changes corresponding to movement. In another example, the cloud computing service can detect gestures and other non-verbal cues that may be of interest, particularly if associated with an interruption.

At block 906, the client device may detect an absence of speech content during a speech instance. For example, the application of the client device may include a speech detector (e.g., speech detector 216 in FIG. 2, etc.) that is configured to at least identify whether the audio captured comprises speech. In some aspects, speech detector may be heuristics (e.g., logic, rules, and pattern matching) and/or a small classifier ML model. In some cases, the application client device is configured to monitor speech irrespective of the speech instance to allow the client device to identify an interruption. For example, when the synthetic speech of a generative response engine is being output by the client device, the user may speak to interrupt the synthetic speech. In response to detecting the absence of speech content, the client device may be transmitting an indication of the absence of speech content to the generative response engine to transmit an indication of the absence of speech content to the cloud computing service (e.g., the generative response engine).

In some aspects, the cloud computing service is configured to detect an end to a speech instance based on detecting silence and a context of the speech instance. For example, the cloud computing service includes a speech instance engine (e.g., speech instance engine 224 in FIG. 2) and a conversational classifier (e.g., conversation classifier 222 in FIG. 2) to identify whether the audio frames received from the client device form an independent clause (e.g., a complete sentence or an incomplete sentence). Identification of an independent clause corresponds to an end of the speech instance, and based on detecting the end of the speech instance, the cloud computing service may transmit remaining audio frames and selected video frames (e.g., images) received from the client device to the generative response engine.

At block 909, the client device may provide a stream of data to a cloud computing service associated with a generative response engine, wherein the stream of data includes at least the plurality of audio frames and the plurality of images. For example, the client device can capture audio at 10 Hz (e.g., 100 millisecond audio frames) and transmit the audio frames as a stream of data over time. In some cases, the stream may include various data, such as a video frame. The stream can also include information detected locally, such as the speech by the user.

At block 910, the computing system may receive a stream of generated data from the cloud computing service, the stream of generated data comprising content generated at the generative response engine responsive to at least the audio content.

In some aspects, the cloud computing service may be configured to transmit, to the generative response engine, a cancellation signal to cancel a current inference task and restart based on accumulated tokens. For example, after a silence detected by the client device, the cloud computing service may pause audio frames transmitted to the generative response engine, and upon resuming the audio frames, the context of the conversation may have changed based on the audio. The generative response engine may cancel the inference task and begin again based on the accumulated tokens associated with the speech instance. In some cases, the generative response engine may be able to use some cached tokens from lower layers of the transformer engine.

Figure 10:
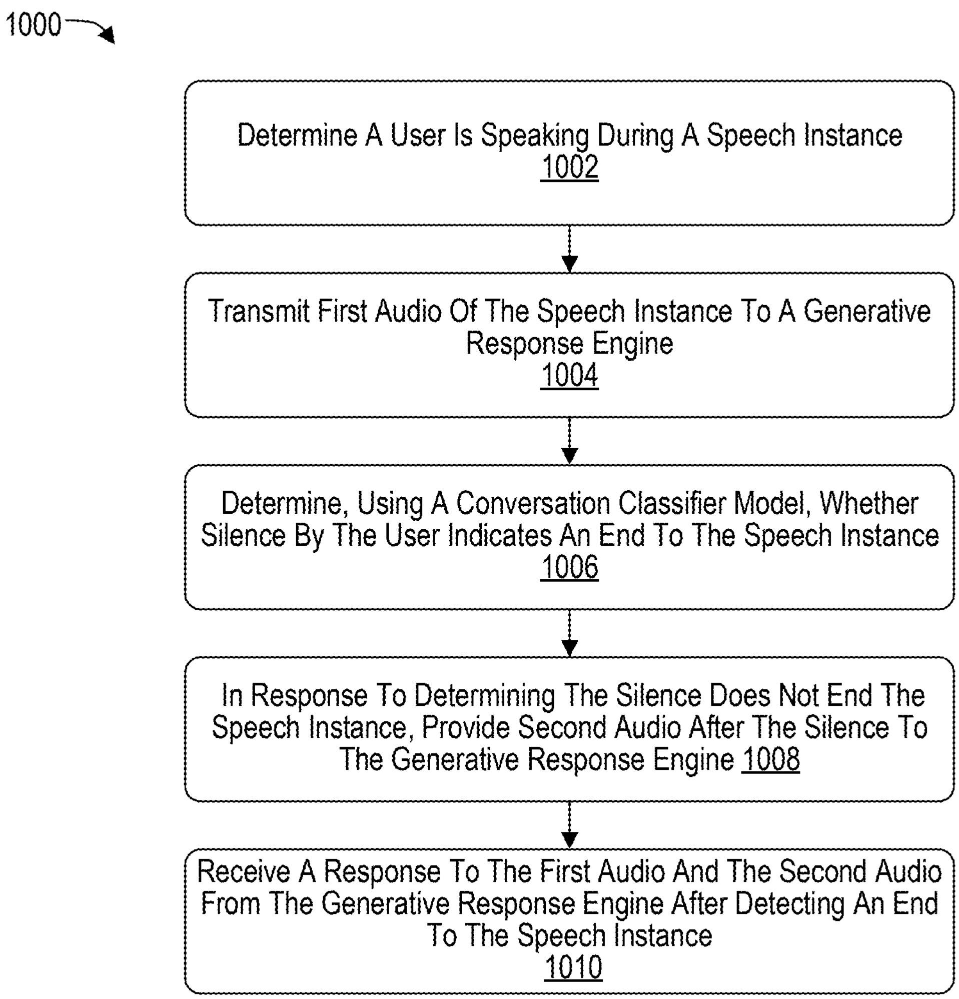
FIG. 10 is a flow diagram of a process for detecting an end of a speech instance in accordance with some aspects of the disclosure.

FIG. 10 is a flow diagram of a process 1000 for detecting an end of a speech state for a user speech instance in accordance with some aspects of the disclosure. The process 1000 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., an ML system such as a neural network model, any combination thereof, and/or other component or system) of the computing device. The operations of process 1000 may be implemented as software components that are executed and run on one or more processors (e.g., CPU, GPU, DSP, NPU or neural engine, SoC, processor 1404 of FIG. 14, and/or other processor(s)). In some aspects, the method described in FIG. 10 can be implemented using a computing system including a client device in conjunction with a cloud computing service.

At block 1002, the computing system may determine a user is speaking during a speech instance. For example, a client device can include a speech detector (e.g., speech detector 216 of FIG. 2) to identify if the user is speaking. A cloud computing service can also include a speech detector to determine if the user is speaking.

At block 1004, the computing system may transmit first audio of the speech instance to a generative response engine. For example, as audio is being processed while the user is speaking, the first audio (e.g., audio frames including audio or audio tokens) is provided to the generative response engine. In this case, the generative response engine may begin processing because the speech includes time domain content that is of unknown duration, and pre-flighting the response can improve latency between the end of speech and the beginning of synthetic speech.

At block 1006, the computing system may determine, using a conversation classifier model, whether silence by the user indicates an end to the speech instance. For example, the conversational classifier is configured to determine whether the first audio corresponds to an independent clause. If the first audio corresponds to an independent clause, the silence corresponds to an end of the speech instance. If the first audio corresponds to an incomplete clause, the silence may indicate that the user is thinking. In some aspects, the computing system may not provide silent frames to the generative response engine.

In some aspects, the computing system may also transmit a signal to the generative response engine to cancel inference of content in the first audio. For example, in the event that the computing system determines the first audio is an incomplete clause, the generative response engine may transmit a cancellation signal to the generative response engine to cancel inference of content in the first audio.

In some cases, the computing system (e.g., the cloud computing service 204) may receive response tokens associated with the first audio. In this case, the computing system may discard the response tokens. For example, the first audio does not comprise an independent clause, the response will be inaccurate and the context of the audio will change based on future speech from the user.

At block 1008, the computing system may, in response to determining the silence does not end the speech instance, provide second audio after the silence to the generative response engine. For example, when the user begins to speak again (e.g., second audio), the computing system may encode the audio into audio tokens and transmit the audio tokens in audio frames to the generative response engine.

In another example, the computing system (e.g., the cloud computing service 204) receives a response to the first audio from the generative response engine while receiving the second audio. The second audio may change the context and, as a result, the computing system may discard the response.

At block 1010, the computing system may, receive a response to the first audio and the second audio from the generative response engine. For example, after the computing system detects an end to the speech instance when the second audio ends (e.g., using a speech instance engine 224 and a conversation classifier 222), the computing system sends information to the generative response engine indicating an end to the speech instance. The computing system also sends any remaining audio frames and video frames (e.g., video tokens). The generative response engine accumulates the audio frames (e.g., audio tokens) combines the video frames (e.g., appends the video tokens after the audio tokens), and generates a response to the combined tokens.

In some aspects, as part of block 1010, the cloud computing service may send the response to a client device.

Figure 11:
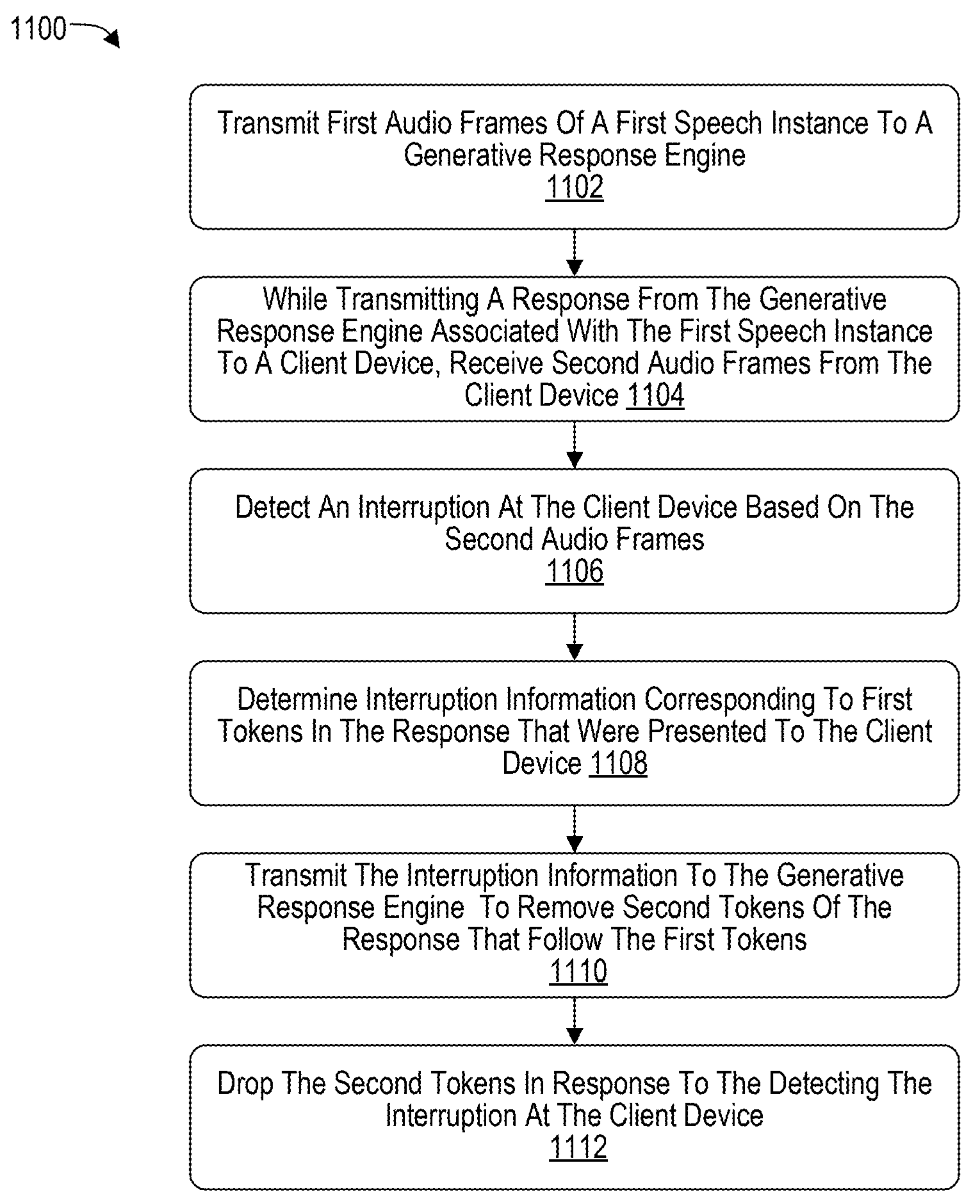
FIG. 11 is a flow diagram of a process for handling user interruptions during real-time conversations with a generative response engine in accordance with some aspects of the disclosure.

FIG. 11 is a flow diagram of a process 1100 for handling user interruptions during real-time conversations with a generative response engine in accordance with some aspects of the disclosure. The process 1100 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., an ML system such as a neural network model, any combination thereof, and/or other component or system) of the computing device. The operations of process 1100 may be implemented as software components that are executed and run on one or more processors (e.g., CPU, GPU, DSP, NPU or neural engine, SoC, the processor 1404 of FIG. 14, and/or other processor(s)). In some aspects, the computing system may be part of a cloud computing service (e.g., cloud computing service 204 in FIG. 2).

At block 1102, the computing system may transmit first audio frames of a first speech instance to a generative response engine.

At block 1104, the computing system may while transmitting a response from the generative response engine associated with the first speech instance to a client device, receive second audio frames from the client device. In some aspects, the response comprises at least one audio frame including synthesized audio from the generative response engine. For example, the first speech may be a request to perform a task (e.g., identify the weather, etc.) and the generative response engine is configured to form the response (e.g., audio, video, text, etc.) corresponding to the input task.

At block 1106, the computing system may detect an interruption at the client device based on the second audio frames. For example, as part of block 1106, the computing system may determine whether at least one frame of the second audio frames includes speech or absence of speech based on a speech detector (e.g., speech detector 216 of FIG. 2). For example, the client device may include the speech detector model and include an indicator (e.g., a Boolean value) identifying whether speech is included in the second audio frames. In other examples, the computing device (e.g., part of cloud computing service 204 in FIG. 2) may include the speech detector model and check the audio frames.

At block 1108, the computing system may determine interruption information corresponding to first tokens in the response that were presented to the client device.

At block 1110, the computing system may transmit the interruption information to the generative response engine, wherein the generative response engine uses the interruption information to remove second tokens of the response that follow the first tokens. In this case, the interruption information can indicate dropping of all tokens that were not presented to the client device. For example, in the example illustrated in FIG. 7, tokens 401-2000 were not presented and the interruption information may indicate a lower boundary associated with tokens to drop. The generative response engine can clear all caches and memory associated with tokens 401-2000 and, in particular, remove tokens 401-2000 from the context window.

The computing system, as part of block 1110 may also transmit a signal to the generative response engine to cancel inference of content in the first audio frames. For example, if the computing system is aware that the generative response engine is forming a response still, the computing system transmits a cancellation signal to halt the interruption.

At block 1112, the computing system may drop the second tokens in response to the detecting the interruption at the client device. In some aspects, the computing system may have already received or be receiving the second tokens from the generative response engine when the interruption is detected at block 1106. In this case, the computing system is configured to drop the second tokens at the computing system (e.g., discard the tokens), to prevent transmitting second tokens to the client device.

In some aspects, the computing system may also include video frames to provide to the generative response engine. For example, the computing system may select at least one video frame from the client device associated with the response. The video frame can occur before or after the audio frames and associated with speech or non-speech. The audio frames provided to the generative response engine are only associated with the user speech or audio content. The computing system transmits a portion of the second audio frames associated with a second speech instance and the at least one video frame to the generative response engine. The generative response engine accumulates audio tokens in an array of audio tokens and then appends video tokens at the end of the array.

In some aspects, the computing system may also track tokens and/or frames sent to the client device. In one aspect, the computing system may initiate a counter outside of the scope associated with a transmission function for transmitting the response. For example, a counter can be injected into an asynchronous function. The transmission function can update the counter to identify the latest token (e.g., the last token or frame) of the response transmitted to the client device. In another aspect, the transmission function may also include a cancellation, and a counter associated with the transmission function can be exposed. An example of exposing the counter is illustrated above with reference to Table 2.

In some aspects, although processes 900, 1000, and 1100 illustrate discrete blocks, processes 900, 1000, and 1100 *i* are asynchronous and the blocks illustrated in FIG. 9-11 can occur in sequence or parallel. For example, audio of the user is captured while the audio frames are being transmitted to the cloud computing service.

Figure 12:
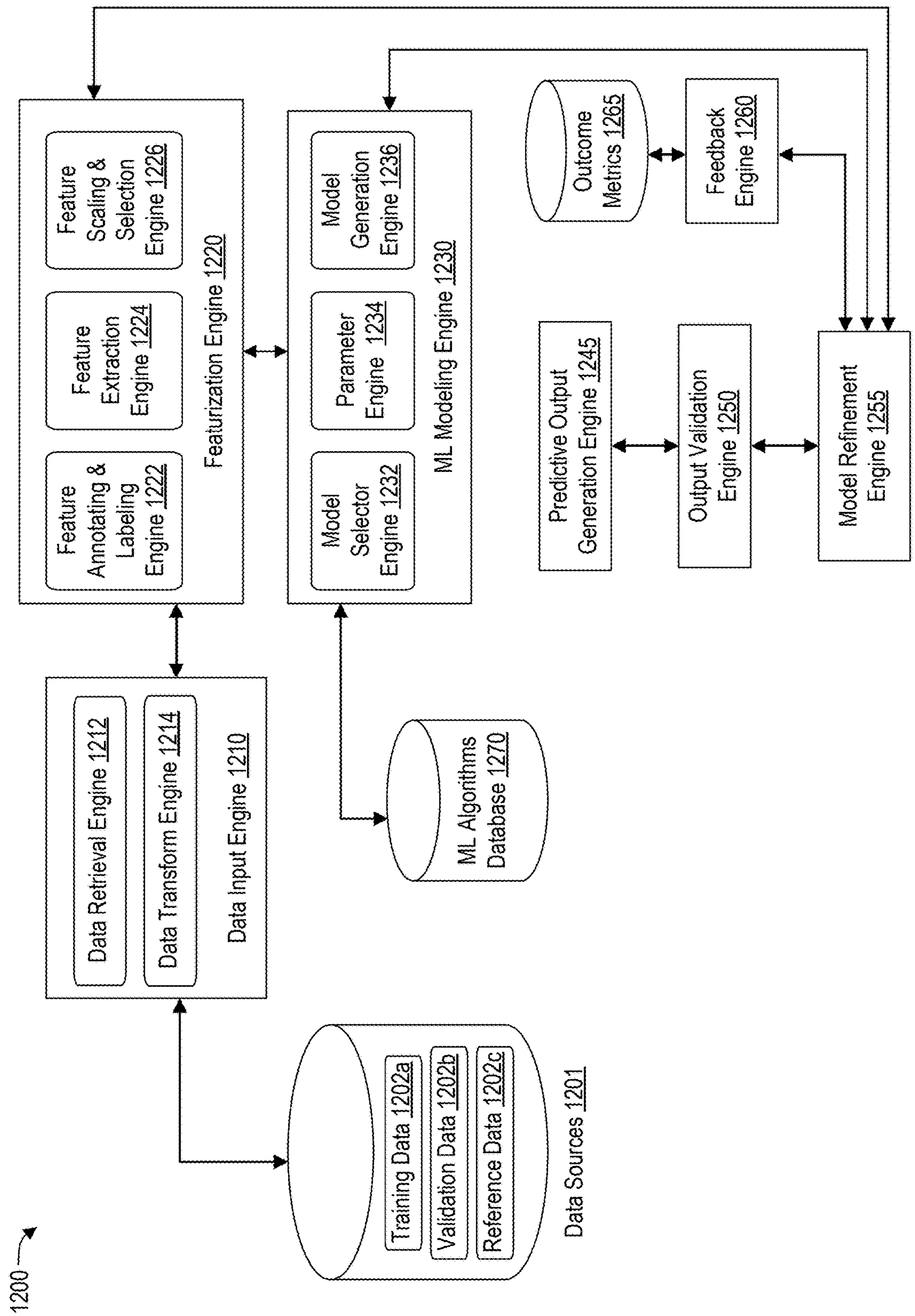
FIG. 12 is a block diagram illustrating an example machine learning platform for implementing various aspects of this disclosure in accordance with some aspects of the present disclosure.

FIG. 12 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 1200 may include data input engine 1210 that can further include data retrieval engine 1212 and data transform engine 1214. Data retrieval engine 1212 may be configured to access, interpret, request, or receive data, which may be adjusted, reformatted, or changed (e.g., to be interpretable by another engine, such as data input engine 1210). For example, data retrieval engine 1212 may request data from a remote source using an API. Data input engine 1210 may be configured to access, interpret, request, format, re-format, or receive input data from data sources(s) 1201. For example, data input engine 1210 may be configured to use data transform engine 1214 to execute a re-configuration or other change to data, such as a data dimension reduction. In some embodiments, data sources(s) 1201 may be associated with a single entity (e.g., organization) or with multiple entities. Data sources(s) 1201 may include one or more of training data 1202*a* (e.g., input data to feed a machine learning model as part of one or more training processes), validation data 1202*b* (e.g., data against which at least one processor may compare model output with, such as to determine model output quality), and/or reference data 1202*c*. In some embodiments, data input engine 1210 can be implemented using at least one computing device. For example, data from data sources(s) 1201 can be obtained through one or more I/O devices and/or network interfaces. Further, the data may be stored (e.g., during execution of one or more operations) in a suitable storage or system memory. Data input engine 1210 may also be configured to interact with a data storage, which may be implemented on a computing device that stores data in storage or system memory.

System 1200 may include featurization engine 1220. Featurization engine 1220 may include feature annotating and labeling engine 1222 (e.g., configured to annotate or label features from a model or data, which may be extracted by feature extraction engine 1224), feature extraction engine 1224 (e.g., configured to extract one or more features from a model or data), and/or feature scaling and selection engine 1226. Feature scaling and selection engine 1226 may be configured to determine, select, limit, constrain, concatenate, or define features (e.g., AI features) for use with AI models.

System 1200 may also include machine learning (ML) ML modeling engine 1230, which may be configured to execute one or more operations on a machine learning model (e.g., model training, model re-configuration, model validation, model testing), such as those described in the processes described herein. For example, ML modeling engine 1230 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 1202*a*) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 1230 may include model selector engine 1232 (e.g., configured to select a model from among a plurality of models, such as based on input data), parameter engine 1234 (e.g., configured to add, remove, and/or change one or more parameters of a model), and/or model generation engine 1236 (e.g., configured to generate one or more machine learning models, such as according to model input data, model output data, comparison data, and/or validation data).

In some embodiments, model selector engine 1232 may be configured to receive input and/or transmit output to ML algorithms database 1270. Similarly, featurization engine 1220 can utilize storage or system memory for storing data and can utilize one or more I/O devices or network interfaces for transmitting or receiving data. ML algorithms database 1270 may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 1270 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 1270 include versions DALL•E, CHAT GPT, and SORA, all provided by OPEN AI.

System 1200 can further include predictive output generation engine 1245 and output validation engine 1250 (e.g., configured to apply validation data to machine learning model output). Predictive output generation engine 1245 can analyze the input and identify relevant patterns and associations in the data it has learned to generate a sequence of words that predictive output generation engine 1245 predicts is the most likely continuation of the input using one or more models from the ML algorithms database 1270, aiming to provide a coherent and contextually relevant answer. Predictive output generation engine 1245 generates responses by sampling from the probability distribution of possible words and sequences, guided by the patterns observed during its training. In some embodiments, predictive output generation engine 1245 can generate multiple possible responses before presenting the final one. Predictive output generation engine 1245 can generate multiple responses based on the input, and these responses are variations that predictive output generation engine 1245 considers potentially relevant and coherent. Output validation engine 1250 can evaluate these generated responses based on certain criteria. These criteria can include relevance to the prompt, coherence, fluency, and sometimes adherence to specific guidelines or rules, depending on the application. Based on this evaluation, output validation engine 1250 selects the most appropriate response. This selection is typically the one that scores highest on the set criteria, balancing factors like relevance, informativeness, and coherence.

System 1200 can further include feedback engine 1260 (e.g., configured to apply feedback from a user and/or machine to a model) and model refinement engine 1255 (e.g., configured to update or re-configure a model). In some embodiments, feedback engine 1260 may receive input and/or transmit output (e.g., output from a trained, partially trained, or untrained model) to outcome metrics database 1265. Outcome metrics database 1265 may be configured to store output from one or more models and may also be configured to associate output with one or more models. In some embodiments, outcome metrics database 1265, or other device (e.g., model refinement engine 1255 or feedback engine 1260), may be configured to correlate output, detect trends in output data, and/or infer a change to input or model parameters to cause a particular model output or type of model output. In some embodiments, model refinement engine 1255 may receive output from predictive output generation engine 1245 or output validation engine 1250. In some embodiments, model refinement engine 1255 may transmit the received output to featurization engine 1220 or ML modeling engine 1230 in one or more iterative cycles.

The engines of system 1200 may be packaged functional hardware units designed for use with other components or a part of a program that performs a particular function (e.g., of related functions). Any or the of these modules may be implemented using a computing device. In some embodiments, the functionality of system 1200 may be split across multiple computing devices to allow for distributed processing of the data, which may improve output speed and reduce computational load on individual devices. In some embodiments, system 1200 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 1200 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 13A:
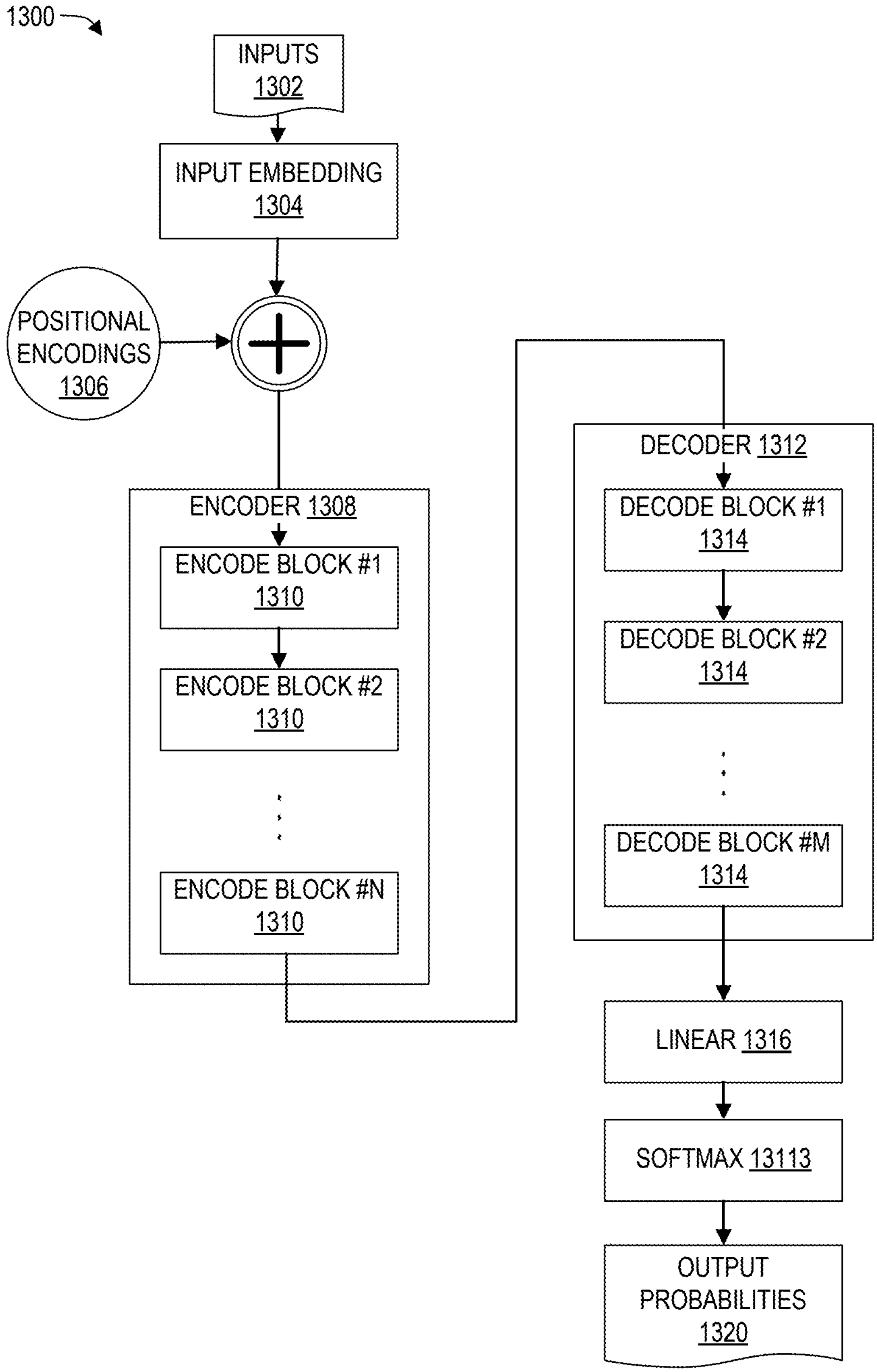
FIG. 13A, FIG. 13B, and FIG. 13C illustrates an example transformer architecture in accordance with some embodiments of the present disclosure.
Figure 13B:
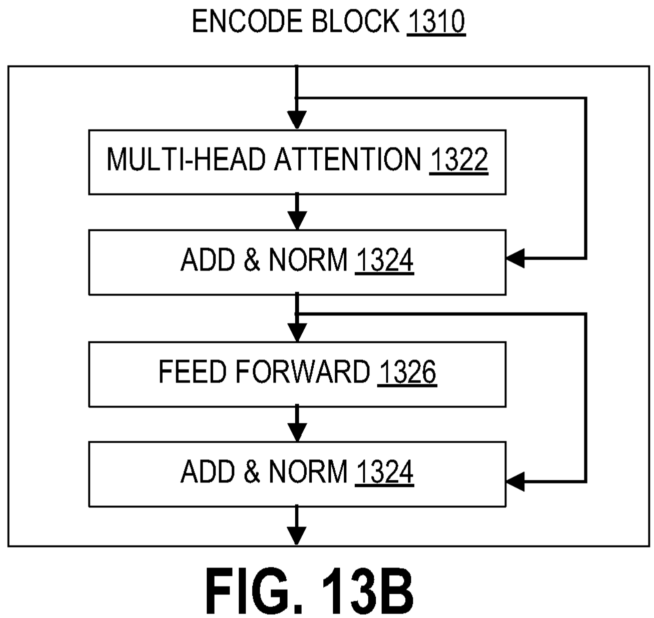
Figure 13C:
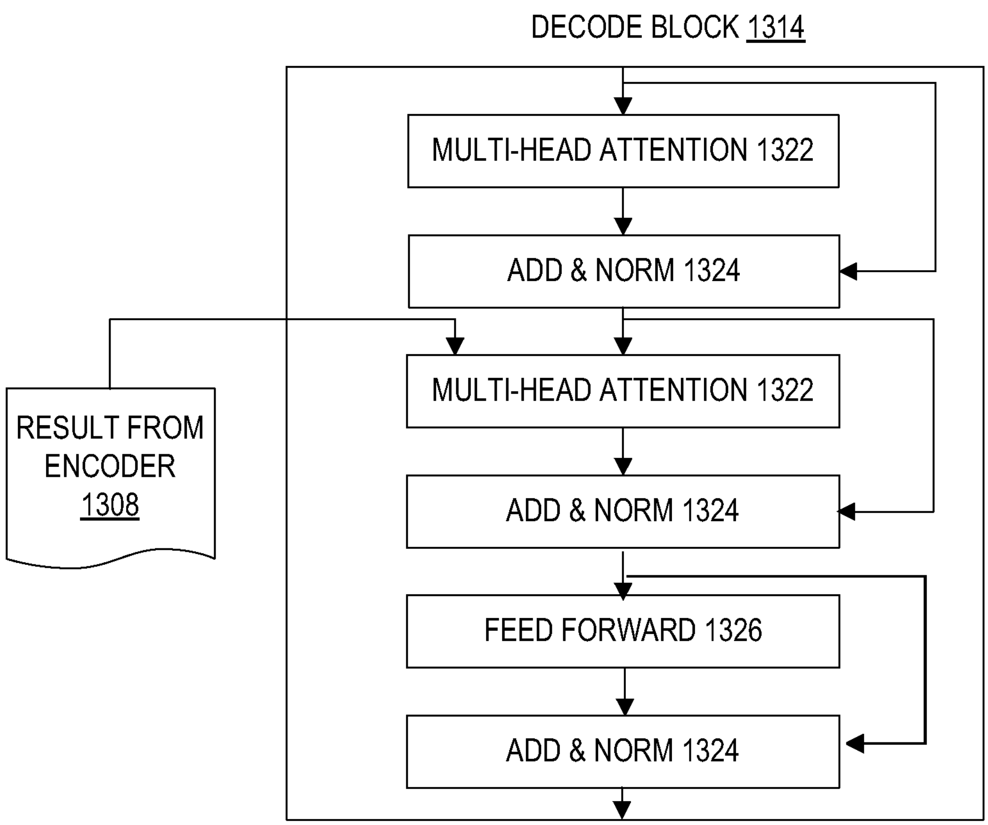

FIG. 13A, FIG. 13B, and FIG. 13C illustrates an example transformer architecture in accordance with some embodiments of the present technology. Examples of ML models that use a transformer neural network (e.g., transformer architecture 1300) can include, e.g., generative pretrained transformer (GPT) models and Bidirectional Encoder Representations from Transformer (BERT) models. The transformer architecture 1300, which is illustrated in FIG. 13A, FIG. 13B, and FIG. 13C, includes inputs 1302, input embedding block 1304, positional encodings 1306, encoder 1308 including encode blocks 1310, decoder 1312 including decode blocks 1314, linear block 1316, softmax block 13113, and output probabilities 1320.

Input embedding block 1304 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 1304 can be learned embeddings to convert the input tokens and output tokens to vectors of dimension that have the same dimension as the positional encodings, for example.

Positional encodings 1306 provide information about the relative or absolute position of the tokens in the sequence. According to certain non-limiting examples, positional encodings 1306 can be provided by adding positional encodings to the input embeddings at the inputs to the encoder 1308 and decoder 1312. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, the dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 1308 can use stacked self-attention and pointwise, fully connected layers. Encoder 1308 can be a stack of N identical layers (e.g., N=6), and the layer can be an encode block, as illustrated by encode block 1310 shown in FIG. 13B. The encode block 1310 has two sub-layers: (i) a first sub-layer has a multi-head attention block 1322 and (ii) a second sub-layer has a feed forward block 1326, which can be a position-wise fully connected feed-forward network. The feed forward block 1326 can use a rectified linear unit (ReLU).

Encoder 1308 uses a residual connection around the of the two sub-layers, followed by an add and norm block 1324, which performs normalization. For example, the output of the sub-layer can be LayerNorm(x+Sublayer(x)). To facilitate these residual connections, all sub-layers in the model, as well as the embedding layers, produce output data having a same dimension.

Similar to encoder 1308, decoder 1312 uses stacked self-attention and point-wise, fully connected layers. Decoder 1312 can also be a stack of M identical layers (e.g., M=6), and the layer can be a decode block, as illustrated by decode block 1314 shown in FIG. 13C. In addition to the two sub-layers (i.e., the sublayer with multi-head attention block 1322 and the sub-layer with feed forward block 1326) found in encode block 1310, decode block 1314 can include a third sub-layer, which performs multi-head attention over the output of the encoder stack. Similar to encoder 1308, decoder 1312 uses residual connections around the of the sub-layers, followed by layer normalization. Additionally, the sub-layer with multi-head attention block 1322 can be modified in the decoder stack to prevent positions from attending to subsequent positions. This masking, combined with the fact that the output embeddings are offset by one position, can ensure that the predictions for position i can depend only on the known output data at positions less than i.

Linear block 1316 can be a learned linear transformation. For example, when transformer architecture 1300 is being used to translate from a first language into a second language, linear block 1316 can project the output from the last decode softmax block 13113 into word scores for the second language (e.g., a score value for the unique word in the target vocabulary) at the position in the sentence. For instance, if the output sentence has seven words and the provided vocabulary for the second language has 10,000 unique words, then 10,000 score values are generated for the of those seven words. The score values indicate the likelihood of occurrence for the word in the vocabulary in that position of the sentence.

Softmax block 13113 then turns the scores from linear block 1316 into output probabilities 1320 (which add up to 1.0). In the position, the index provides for the word with the highest probability, and then maps that index to the corresponding word in the vocabulary. Those words then form the output sequence of transformer architecture 1300. The softmax operation is applied to the output from linear block 1316 to convert the raw numbers into output probabilities 1320 (e.g., token probabilities).

Figure 14:
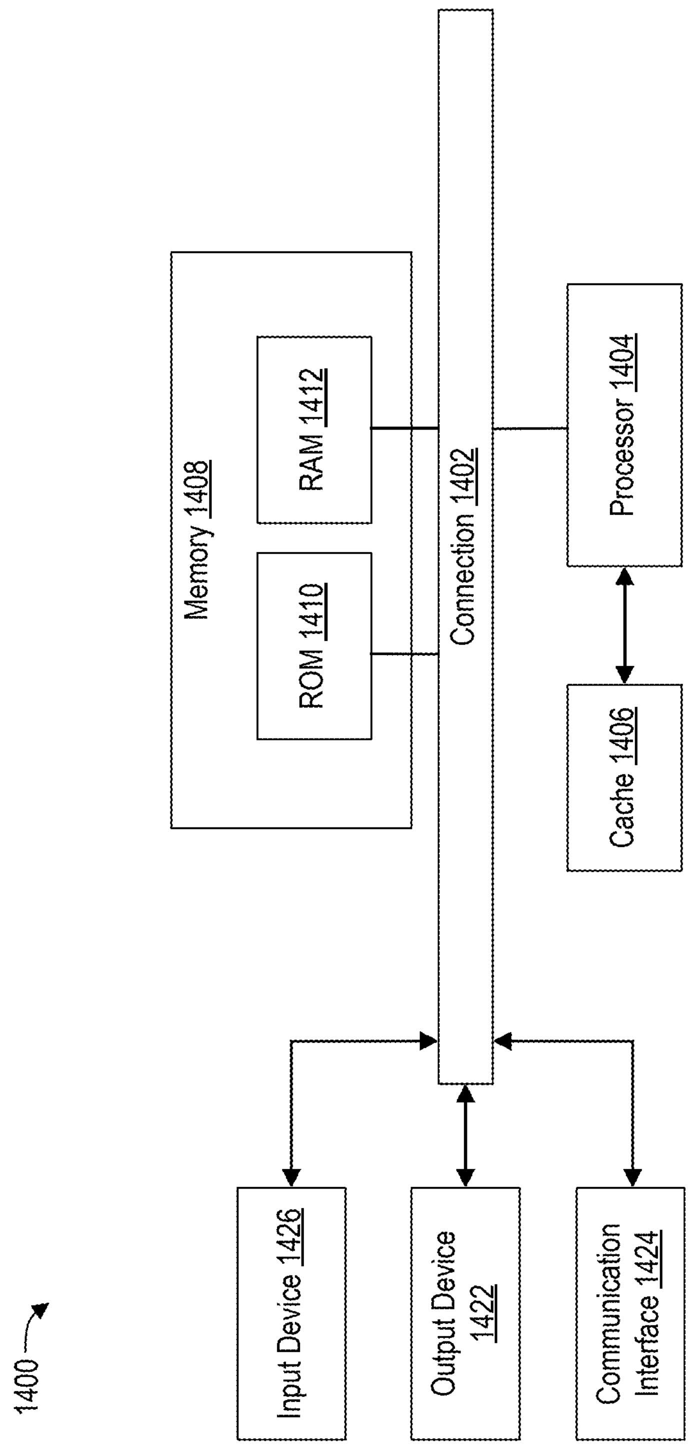
FIG. 14 shows an example of a computing system that can implement various aspects of the present disclosure and any engine illustrated in FIG. 1 or any component thereof.

FIG. 14 shows an example of computing system 1400, which can be, for example, any computing device making up any engine, any processing device or server, or any component thereof.

In some embodiments, computing system 1400 is a single device, or a distributed system in which the functions described in this disclosure can be distributed within a datacenter, multiple data centers, a peer network, etc. In some embodiments, one or more of the described system components represents many such components the performing some or all of the function for which the component is described. In some embodiments, the components can be physical or virtual devices.

In some embodiments, computing system 1400 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1400 includes at least one processing unit (CPU or processor) 1404 and connection 1402 that couples various system components including system memory 1408, such as read-only memory (ROM) 1410 and random access memory (RAM) 1412 to processor 1404. Memory 1408 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1408 can include software services, servers, logic, etc., that when the code that defines such software is executed by the processor 1404, it causes the system to perform a function. In some embodiments, a hardware service that performs a particular function can include the software component stored in a computer-readable medium in connection with the necessary hardware components, such as processor 1404, connection 1402, output device 1422, etc., to carry out the function.

Computing system 1400 can include a cache of high-speed memory 1406 connected directly with, in close proximity to, or integrated as part of processor 1404.

Connection 1402 can be a physical connection via a bus, or a direct connection into processor 1404, such as in a chipset architecture. Connection 1402 can also be a virtual connection, networked connection, or logical connection.

Processor 1404 can include any general purpose processor and a hardware service or software service stored in memory 1408, configured to control processor 1404 as well as a special-purpose processor where software instructions are incorporated into the actual processor design. Processor 1404 may essentially be a completely self-contained computing system, containing multiple cores or processors, a bus, memory controller, cache, etc. A multi-core processor may be symmetric or asymmetric. Processor 1404 can be physical or virtual.

To enable user interaction, computing system 1400 includes an input device 1426, which can represent any number of input mechanisms, such as a microphone for speech, a touch-sensitive screen for gesture or graphical input, keyboard, mouse, motion input, speech, etc. Computing system 1400 can also include output device 1422, which can be one or more of a number of output mechanisms known to those of skill in the art. In some instances, multimodal systems can enable a user to provide multiple types of input/output to communicate with computing system 1400. Computing system 1400 can include communication interface 1424, which can generally govern and manage the user input and system output. There is no restriction on operating on any particular hardware arrangement, and therefore the basic features here may easily be substituted for improved hardware or firmware arrangements as they are developed.

In some embodiments, computing system 1400 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1. A computing device associated with a cloud computing service, comprising: at least one network interface; and at least one processor coupled to the at least one network interface and configured to: receive audio frames from a client device; determine that a first portion of the audio frames includes speech of a user during a speech instance; transmit the first portion of the audio frames that includes the speech to a generative response engine; determine that the speech instance has concluded; and send a signal to the generative response engine to perform an inference operation based on the first portion of the audio frames.

Aspect 2. The computing device of Aspect 1, wherein the at least one processor is configured to: prior to the determination that the speech instance has concluded, determine that the first portion of the audio frames does not correspond to an end to the speech instance; and transmit a second portion of the audio frames to the generative response engine, wherein the determination that the speech instance has concluded is based on the first portion of the audio frames and the second portion of the audio frames, and the inference operation is performed based on the first portion of the audio frames and the second portion of the audio frames.

Aspect 3. The computing device of any of Aspects 1 to 2, wherein transmitting of the first portion of the audio frames begins prior to the determination that the speech instance has concluded.

Aspect 4. The computing device of any of Aspects 1 to 3, wherein the determination that the first portion of the audio frames includes speech is performed by a speech detector that is configured to detect a presence of speech in the audio frames, and the determination that the speech instance has concluded is performed by a conversation classifier that is configured to determine whether the audio frames include speech that indicates the end of the speech instance.

Aspect 5. The computing device of any of Aspects 1 to 4, wherein the at least one processor is configured to: receive a second portion of the audio frames that include speech after the signal to perform the inference operation has been sent; and transmit a signal to the generative response engine to cancel the inference operation based on the first portion of the audio frames.

Aspect 6. The computing device of Aspect 5, wherein the at least one processor is configured to: receive a response from the performance of the inference operation based on the first portion of the audio frames from the generative response engine while receiving the second portion of the audio frames; and discarding the response.

Aspect 7. The computing device of any of Aspects 1 to 6, wherein the at least one processor is configured to: receive a response from the performance of the inference operation based on the first portion of the audio frames from the generative response engine; and send the response to the client device.

Aspect 8. The computing device of Aspect 7, wherein the at least one processor is configured to: determine a first audio frame of the audio frames after the first portion of the audio frames indicates the silence.

Aspect 9. The computing device of Aspect 8, wherein the at least one processor is configured to: receive, from the client device, a speech indicator indicating that the user is speaking at the client device or the silence.

Aspect 10. The computing device of any of Aspects 8 to 9, wherein the computing device includes a speech detector model configured to determine the user is speaking at the client device or the silence.

Aspect 11. The computing device of any of Aspects 1 to 10, wherein the computing device includes a conversation classifier configured to determine the first portion of the audio frames do not correspond to the end of the speech instance based on the first portion of the audio frames.

Aspect 12. The computing device of Aspect 11, wherein the conversation classifier is configured to indicate the first portion of the audio frames correspond to an incomplete clause and the first portion of the audio frames and the second portion of the audio frames correspond to an independent clause.

Aspect 13. A method comprising: determining, using a speech detector, that a user is speaking during a speech instance; transmitting first audio of the speech instance to a generative response engine; determining, using a speech instance engine that, a period of silence by the user; does not end the speech instance; and providing second audio after the period of silence to the generative response engine, wherein the second audio is a continuation of the speech instance, wherein the generative response engine does not begin inference operations on the first audio.

Aspect 14. The method of Aspect 13, further comprising: determining, using the speech instance engine, from the first audio and second audio that the user has completed the speech instance; and transmitting a signal to the generative response engine to begin inference on the first audio.

Aspect 15. The method of Aspect 14, further comprising: receiving third audio while the generative response engine is performing an inference operation; transmitting a signal to the generative response engine to cancel the inference operation.

Aspect 16. The method of Aspect 15, further comprising: receiving at least a partial response to the first audio from the generative response engine; and discarding the at least the partial response.

Aspect 17. The method of any of Aspects 13 to 16, further comprising: receive a response from the performance of the inference operation based on the first audio from the generative response engine; and send the response to the client device.

Aspect 18. The method of any of Aspects 13 to 17, wherein determining the user is speaking during the speech instance comprises: receiving, from a client device, a speech indicator indicating that the user is speaking.

Aspect 19. The method of Aspect 18, wherein a speech detection model of the client device is configured to detect speech.

Aspect 20. The method of any of Aspects 13 to 19, wherein a speech detection model is configured to detect speech.

Aspect 21. A computing device includes at least one memory and at least one processor coupled to the at least one memory. The computing device is configured to determine, using a speech detector, that a user is speaking during a speech instance; transmit first audio of the speech instance to a generative response engine; determine, using a speech instance engine that, a period of silence by the user; does not end the speech instance; and provide second audio after the period of silence to the generative response engine, wherein the second audio is a continuation of the speech instance, wherein the generative response engine does not begin inference operations on the first audio.

Aspect 22. The computing device of Aspect 21, wherein the at least one processor is configured to: determine, using the speech instance engine, from the first audio and second audio that the user has completed the speech instance; and transmit a signal to the generative response engine to begin inference on the first audio.

Aspect 23. The computing device of Aspect 22, wherein the at least one processor is configured to: receive third audio while the generative response engine is performing an inference operation; and transmit a signal to the generative response engine to cancel the inference operation.

Aspect 24. The computing device of Aspect 23, wherein the at least one processor is configured to: receive at least a partial response to the first audio from the generative response engine; and discard the at least the partial response.

Aspect 25. The computing device of any of Aspects 21 to 24, wherein the at least one processor is configured to: receive a response from the performance of the inference operation based on the first audio from the generative response engine; and send the response to the client device.

Aspect 26. The computing device of any of Aspects 21 to 25, wherein the at least one processor is configured to: receive, from a client device, a speech indicator indicating that the user is speaking.

Aspect 27. The computing device of Aspect 26, wherein a speech detection model of the client device is configured to detect speech.

Aspect 28. The computing device of any of Aspects 21 to 27, wherein a speech detection model is configured to detect speech.

Aspect 29. A computing device including at least one memory and at least one processor coupled to the at least one memory and configured to: at least one microphone; and at least one processor coupled to the at least one microphone and configured to: capture, using the at least one microphone, audio frames at a first frame rate during a speech instance of a user, the audio frames including audio content; identify, using a speech detector, that the audio frames include speech or an absence of speech; and transmit the audio frames to a cloud computing service including a generative response engine, wherein the cloud computing service uses a speech instance engine to determine an end of the speech instance based on the audio frames.

Aspect 30. The computing device of Aspect 29, wherein the first frame rate is approximately 10 frames per second.

Aspect 31. The computing device of any of Aspects 29 to 30, wherein the at least one processor is configured to: receive a stream of generated data from the cloud computing service, the stream of generated data comprising content generated at the generative response engine responsive to at least the audio content.

Aspect 32. The computing device of Aspect 31, wherein the stream of generated data is based on a first portion of the audio frames and a second portion of the audio frames, wherein the stream of generated data is not based on a portion of the audio frames between the first portion and the second portion that are classified as the absence of speech.

Aspect 33. The computing device of Aspect 32, wherein the portion of the audio frames between the first portion and the second portion correspond to audio with a length of greater than a second.

Aspect 34. The computing device of any of Aspects 31 to 33, wherein the at least one processor is configured to: capture, using the at least one microphone, second audio frames of a second speech instance of a user while the stream of generated data is being output; end the output of the stream of generated data based on the second audio frames; and transmit the second audio frames to the cloud computing service.

Aspect 35. The computing device of any of Aspects 29 to 34, wherein the at least one processor is configured to: capture, by an image sensor, a plurality of images having a variable frame rate based on a speaking state.

Aspect 36. The computing device of Aspect 35, wherein the variable frame rate is approximately 3 frames per second during the speech instance of the user and 1 frame per second during a non-speech instance.

Aspect 37. The computing device of any of Aspects 35 to 36, wherein the at least one processor is configured to: display a preview of the image sensor in the application in a view finder.

Aspect 38. A method comprising: receiving, by a front end to a generative response engine, a first input effective to initiate a real-time voice mode of operation, in response to the first input, presenting a real-time voice mode user interface, wherein the real-time voice mode user interface visually demonstrates that it is in a listening state; receiving first audio including a speech instance; in response to receiving the first audio, visually demonstrating, in the real-time voice mode, that the first audio has been detected; streaming the first audio to the generative response engine so that the generative response engine can perform an inference option on the speech instance; when there is a delay between when the first audio including the speech instance has concluded, and when a response is presented to the user, visually or audibly presenting a processing feedback, wherein the processing feedback is a distinct audible sequence; receiving the response from the generative response engine, wherein the response includes streamed audio frames; playing the response from the generative response engine; while playing the response from the generative response engine, visually demonstrating that the real-time voice mode is presenting the response.

Aspect 39. The method of Aspect 38, wherein the generative response engine performs the inference operation and streams the audio frames as they are generated to be played by the front end, wherein the generative response engine continues with the inference operation while a first portion of the response is played by the front end.

Aspect 40. The method of Aspect 39, further comprising: while the generative response engine is performing the inference operation, detecting second audio including speech; sending an interrupt to the generative response engine that is effective to cancel the interference operation.

Aspect 41. The method of any of Aspects 38 to 40, further comprising: while the front end is playing the response, detecting second audio; pausing the playing of the response.

Aspect 42. The method of Aspect 41, further comprising: while the response is paused, determining that the second audio does not contain speech; and resuming the playing the response.

Aspect 43. The method of any of Aspects 41 to 42, further comprising: while the response is paused, determining that the second audio contains speech; and discarding unplayed audio that is part of the response.

Aspect 44. The method of Aspect 43, further comprising: presenting a visual indication that the real-time voice interface is back to a listening state.

Aspect 45. The method of any of Aspects 38 to 44, further comprising: receiving a user input selecting an option to capture video frames; capturing the video frames; displaying the captured video frames in a view finder in the real-time voice mode user interface.

Aspect 46. The method of Aspect 45, further comprising: sending a subset of the video frames to the generative response engine.

Aspect 47. The method of Aspect 46, wherein the subset of the video frames is sent at a reduced frame rate compared to a video capture frame rate.

Aspect 48. The method of any of Aspects 46 to 47, wherein the video frames are sent in variable frame rate that depends on whether the first audio including the speech instance is detected.

Aspect 49. The method of Aspect 48, wherein the variable frame rate is approximately 3 frames per second during the speech instance of the user and 1 frame per second during a non-speech instance.

Aspect 50. A computing device including at least one memory and at least one processor coupled to the at least one memory and configured to: receive, by a front end to a generative response engine, a first input effective to initiate a real-time voice mode of operation, in response to the first input, present a real-time voice mode user interface, wherein the real-time voice mode user interface visually demonstrates that it is in a listening state; receiving first audio including a speech instance; in response to receiving the first audio, visually demonstrate, in the real-time voice mode, that the first audio has been detected; stream the first audio to the generative response engine so that the generative response engine can perform an inference option on the speech instance; when there is a delay between when the first audio including the speech instance has concluded, and when a response is presented to the user, visually or audibly present a processing feedback, wherein the processing feedback is a distinct audible sequence; receive the response from the generative response engine, wherein the response includes streamed audio frames; playing the response from the generative response engine; while playing the response from the generative response engine, visually demonstrate that the real-time voice mode is presenting the response.

Aspect 51. The computing device of Aspect 50, wherein the at least one processor is configured to: wherein the generative response engine performs the inference operation and streams the audio frames as they are generated to be played by the front end, wherein the generative response engine continues with the inference operation while a first portion of the response is played by the front end.

Aspect 52. The computing device of Aspect 51, wherein the at least one processor is configured to: while the generative response engine is performing the inference operation, detect second audio including speech; and send an interrupt to the generative response engine that is effective to cancel the interference operation.

Aspect 53. The computing device of any of Aspects 50 to 52, wherein the at least one processor is configured to: while the front end is playing the response, detect second audio; and pause the playing of the response.

Aspect 54. The computing device of Aspect 53, wherein the at least one processor is configured to: while the response is paused, determine that the second audio does not contain speech; and resume the playing the response.

Aspect 55. The computing device of any of Aspects 53 to 54, wherein the at least one processor is configured to: while the response is paused, determine that the second audio contains speech; and discard unplayed audio that is part of the response.

Aspect 56. The computing device of Aspect 55, wherein the at least one processor is configured to: present a visual indication that the real-time voice interface is back to a listening state.

Aspect 57. The computing device of any of Aspects 50 to 56, wherein the at least one processor is configured to: receive a user input selecting an option to capture video frames; capturing the video frames; and display the captured video frames in a view finder in the real-time voice mode user interface.

Aspect 58. The computing device of Aspect 57, wherein the at least one processor is configured to: send a subset of the video frames to the generative response engine.

Aspect 59. The computing device of Aspect 58, wherein the subset of the video frames is sent at a reduced frame rate compared to a video capture frame rate.

Aspect 60. The computing device of any of Aspects 58 to 59, wherein the video frames are sent in variable frame rate that depends on whether the first audio including the speech instance is detected.

Aspect 61. The computing device of Aspect 60, wherein the variable frame rate is approximately 3 frames per second during the speech instance of the user and 1 frame per second during a non-speech instance.

Aspect 62. A method comprising: receiving, by a computing service, first audio frames associated with a speech instance at a client device and first video frames, wherein the first audio frames are provided at a first rate and the first video frames are provided at a variable rate; providing keyframes from the first video frames to send to a generative response engine for inference operation; transmitting the first audio frames and the keyframes to the generative response engine; and transmitting, to the client device, a stream of generated data generated by the generative response engine based on the first audio frames and the keyframes.

Aspect 63. The method of Aspect 62, further comprising: determining an end of the speech instance based on identification of an independent clause in the first audio frames and an identification of silence; and transmitting a signal to the generative response engine to complete the inference operation based on detection of the end of the speech instance.

Aspect 64. The method of Aspect 63, further comprising: receiving the identification of the silence from the client device.

Aspect 65. The method of any of Aspects 63 to 64, further comprising: determining an audio frame in the first audio frames corresponds to the silence at the client device.

Aspect 66. The method of any of Aspects 62 to 65, wherein at least one video frame of the keyframes is provided by the client device before the first audio frames.

Aspect 67. The method of any of Aspects 62 to 66, wherein at least one video frame of the keyframes is provided during silence associated with the first audio frames.

Aspect 68. The method of any of Aspects 62 to 67, wherein providing keyframes from the first video frames comprises: selecting a keyframe from a plurality of the first video frames based on a static frame rate to provide to the generative response engine during the speech instance.

Aspect 69. The method of any of Aspects 62 to 68, wherein selecting the keyframes from the first video frames comprises: selecting the keyframes from the first video frames to send to the generative response engine for the inference operation after detecting an end to the speech instance.

Aspect 70. The method of any of Aspects 62 to 69, wherein a keyframe detector model is configured to identify the keyframes to provide to the generative response engine.

Aspect 71. The method of any of Aspects 62 to 70, further comprising: while transmitting the stream of generated data, receiving second audio frames from the client device indicating an interruption; identifying a portion of the stream of generated data not presented at the client device; and transmitting a signal to the generative response engine identifying the portion of the stream of generated data not presented at the client device Aspect 72. The method of Aspect 71, wherein the generative response engine is configured to drop tokens associated with the portion of the stream of generated data not presented at the client device from a context window.

Aspect 73. The method of any of Aspects 71 to 72, further comprising: determining whether the second audio frames correspond to an interruption.

Aspect 74. The method of any of Aspects 62 to 73, wherein the keyframes are provided to the generative response engine at a lower resolution than the first video frames.

Aspect 75. A computing device including at least one memory and at least one processor coupled to the at least one memory and configured to: receive, by a computing service, first audio frames associated with a speech instance at a client device and first video frames, wherein the first audio frames are provided at a first rate and the first video frames are provided at a variable rate; provide keyframes from the first video frames to send to a generative response engine for inference operation; transmit the first audio frames and the keyframes to the generative response engine; and transmit, to the client device, a stream of generated data generated by the generative response engine based on the first audio frames and the keyframes.

Aspect 76. The computing device of Aspect 75, wherein the at least one processor is configured to: determine an end of the speech instance based on identification of an independent clause in the first audio frames and an identification of silence; and transmit a signal to the generative response engine to complete the inference operation based on detection of the end of the speech instance.

Aspect 77. The computing device of Aspect 76, wherein the at least one processor is configured to: receive the identification of the silence from the client device.

Aspect 78. The computing device of any of Aspects 76 to 77, wherein the at least one processor is configured to: determine an audio frame in the first audio frames corresponds to the silence at the client device.

Aspect 79. The computing device of any of Aspects 75 to 78, wherein at least one video frame of the keyframes is provided by the client device before the first audio frames.

Aspect 80. The computing device of any of Aspects 75 to 79, wherein at least one video frame of the keyframes is provided during silence associated with the first audio frames.

Aspect 81. The computing device of any of Aspects 75 to 80, wherein the at least one processor is configured to: select a keyframe from a plurality of the first video frames based on a static frame rate to provide to the generative response engine during the speech instance.

Aspect 82. The computing device of any of Aspects 75 to 81, wherein the at least one processor is configured to: select the keyframes from the first video frames to send to the generative response engine for the inference operation after detecting an end to the speech instance.

Aspect 83. The computing device of any of Aspects 75 to 82, wherein a keyframe detector model is configured to identify the keyframes to provide to the generative response engine.

Aspect 84. The computing device of any of Aspects 75 to 83, wherein the at least one processor is configured to: while transmitting the stream of generated data, receive second audio frames from the client device indicating an interruption; identify a portion of the stream of generated data not presented at the client device; and transmit a signal to the generative response engine identifying the portion of the stream of generated data not presented at the client device Aspect 85. The computing device of Aspect 84, wherein the generative response engine is configured to drop tokens associated with the portion of the stream of generated data not presented at the client device from a context window.

Aspect 86. The computing device of any of Aspects 84 to 85, wherein the at least one processor is configured to: determine whether the second audio frames correspond to an interruption.

Aspect 87. The computing device of any of Aspects 75 to 86, 88 wherein the keyframes are provided to the generative response engine at a lower resolution than the first video frames.

Aspect 88. A method comprising: transmitting first audio frames of a first speech instance to a generative response engine; while transmitting a response from the generative response engine associated with the first speech instance to a client device, receiving second audio frames from the client device; detecting an interruption at the client device based on the second audio frames; determining interruption information corresponding to first tokens in the response that were presented to the client device; and transmitting the interruption information to the generative response engine, wherein the generative response engine uses the interruption information to remove second tokens of the response that follow the first tokens.

Aspect 89. The method of Aspect 88, further comprising: receiving the second tokens from the generative response engine, wherein the second tokens are not transmitted to the client device when the second audio frames are received.

Aspect 90. The method of any of Aspects 88 to 89, further comprising: dropping the second tokens in response to the detecting the interruption at the client device.

Aspect 91. The method of any of Aspects 88 to 90, further comprising: transmitting a signal to the generative response engine to cancel inference of content in the first audio frames.

Aspect 92. The method of any of Aspects 88 to 91, wherein detecting the interruption at the client device comprises: determining whether at least one frame of the second audio frames includes speech or absence of speech based on a speech detector model.

Aspect 93. The method of any of Aspects 88 to 92, wherein a speech detection model of the client device is configured to detect speech or an absence of speech and include a speech indicator in at least one audio frame of the second audio frames.

Aspect 94. The method of any of Aspects 88 to 93, wherein the response comprises at least one audio frame including synthesized audio from the generative response engine.

Aspect 95. The method of any of Aspects 88 to 94, further comprising: selecting at least one video frame from the client device associated with the response; and transmitting a portion of the second audio frames associated with a second speech instance and the at least one video frame to the generative response engine.

Aspect 96. The method of any of Aspects 88 to 95, further comprising: initiating a counter outside of a scope associated with a transmission function for transmitting the response; and updating, within the transmission function, the counter identifying a latest token of the response transmitted to the client device.

Aspect 97. The method of any of Aspects 88 to 96, further comprising: cancelling transmission of the response to the first speech instance from the generative response engine; and determining a portion of the response provided to the client device, where the interruption information identifies the first tokens in the response that were presented to the client device.

Aspect 98. A computing device, comprising: at least one memory; and at least one processor coupled to the at least one memory and configured to: transmit first audio frames of a first speech instance to a generative response engine; while transmitting a response from the generative response engine associated with the first speech instance to a client device, receive second audio frames from the client device; detect an interruption at the client device based on the second audio frames; determine interruption information corresponding to first tokens in the response that were presented to the client device; and transmit the interruption information to the generative response engine, wherein the generative response engine uses the interruption information to remove second tokens of the response that follow the first tokens.

Aspect 99. The computing device of Aspect 98, wherein the at least one processor is configured to: receive the second tokens from the generative response engine, wherein the second tokens are not transmitted to the client device when the second audio frames are received.

Aspect 100. The computing device of any of Aspects 98 to 99, wherein the at least one processor is configured to: drop the second tokens in response to the detecting the interruption at the client device.

Aspect 101. The computing device of any of Aspects 98 to 100, wherein the at least one processor is configured to: transmit a signal to the generative response engine to cancel inference of content in the first audio frames.

Aspect 102. The computing device of any of Aspects 98 to 101, wherein the at least one processor is configured to: determine whether at least one frame of the second audio frames includes speech or absence of speech based on a speech detector model.

A Aspect 103. The computing device of any of Aspects 98 to 102, wherein a speech detection model of the client device is configured to detect speech or an absence of speech and include a speech indicator in at least one audio frame of the second audio frames.

Aspect 104. The computing device of any of Aspects 98 to 103, wherein the response comprises at least one audio frame including synthesized audio from the generative response engine.

Aspect 105. The computing device of any of Aspects 98 to 104, wherein the at least one processor is configured to: select at least one video frame from the client device associated with the response; and transmit a portion of the second audio frames associated with a second speech instance and the at least one video frame to the generative response engine.

Aspect 106. The computing device of any of Aspects 98 to 105, wherein the at least one processor is configured to: initiate a counter outside of a scope associated with a transmission function for transmitting the response; and update, within the transmission function, the counter identifying a latest token of the response transmitted to the client device.

Aspect 107. The computing device of any of Aspects 98 to 106, wherein the at least one processor is configured to: cancel transmission of the response to the first speech instance from the generative response engine; and determine a portion of the response provided to the client device, where the interruption information identifies the first tokens in the response that were presented to the client device.

What is claimed is:

1. A computing device associated with a cloud computing service, comprising:

at least one network interface; and at least one processor coupled to the at least one network interface and configured to:

receive digital audio frames from a client device, wherein a respective digital audio frame has a fixed duration;

determine that a first portion of the digital audio frames includes speech of a user during a speech instance;

transmit the first portion of the digital audio frames that includes the speech to a generative response engine while the digital audio frames are being received;

when a single digital audio frame is identified as being silent, determine, using a conversation classifier, that the speech instance has concluded based on the single digital audio frame being silent and the first portion of the digital audio frames corresponding to an independent clause, wherein the conversation classifier is configured to identify the independent clause based on accumulated audio frames during the speech instance; and send a start signal to the generative response engine indicating to begin an inference operation associated with the speech based on the first portion of the digital audio frames and the single digital audio frame being silent.

2. The computing device of claim 1, wherein the at least one processor is configured to:

prior to the determination that the speech instance has concluded, determine that the first portion of the digital audio frames does not correspond to an end to the speech instance; and transmit a second portion of the digital audio frames to the generative response engine, wherein the determination that the speech instance has concluded is based on the first portion of the digital audio frames and the second portion of the digital audio frames, and the inference operation is performed based on the first portion of the digital audio frames and the second portion of the digital audio frames.

3. The computing device of claim 1, wherein transmitting of the first portion of the digital audio frames begins prior to the determination that the speech instance has concluded.

4. The computing device of claim 1, wherein the determination that the first portion of the digital audio frames includes speech is performed by a speech detector that is configured to detect a presence of speech in the digital audio frames, and the determination that the speech instance has concluded is performed by the conversation classifier that is configured to determine whether the digital audio frames include speech that indicates an end of the speech instance.

5. The computing device of claim 1, wherein the at least one processor is configured to:

receive a second portion of the digital audio frames that include speech after the start signal to perform the inference operation has been sent; and transmit a cancellation signal to the generative response engine to cancel the inference operation based on the first portion of the digital audio frames.

6. The computing device of claim 5, wherein the at least one processor is configured to:

receive a response from performance of the inference operation based on the first portion of the digital audio frames from the generative response engine while receiving the second portion of the digital audio frames; and discarding the response.

7. The computing device of claim 1, wherein the at least one processor is configured to:

receive a response from performance of the inference operation based on the first portion of the digital audio frames from the generative response engine; and send the response to the client device.

8. The computing device of claim 7, wherein the at least one processor is configured to:

determine a first digital audio frame of the digital audio frames after the first portion of the digital audio frames corresponds to silence, wherein the first digital audio frame includes a nonce word.

9. The computing device of claim 1, wherein the conversation classifier is configured to indicate a second portion of the digital audio frames before the first portion of the digital audio frames correspond to an incomplete clause and the first portion of the digital audio frames and the second portion of the digital audio frames correspond to the independent clause.

10. A method for detecting speech instances, comprising:

receiving digital audio frames from a client device, wherein a respective digital audio frame has a fixed duration;

determining that a first portion of the digital audio frames includes speech of a user during a speech instance;

transmitting the first portion of the digital audio frames that includes the speech to a generative response engine while the digital audio frames are being received;

when a single digital audio frame is identified as being silent, determining, using a conversation classifier, that the speech instance has concluded based on the single digital audio frame being silent and the first portion of the digital audio frames corresponding to an independent clause, wherein the conversation classifier is configured to identify the independent clause based on accumulated digital audio frames during the speech instance; and sending a start signal to the generative response engine indicating to begin an inference operation associated with the speech based on the first portion of the digital audio frames and the single digital audio frame being silent.

11. The method of claim 10, further comprising:

prior to the determination that the speech instance has concluded, determining that the first portion of the digital audio frames does not correspond to an end to the speech instance; and transmitting a second portion of the digital audio frames to the generative response engine, wherein the determination that the speech instance has concluded is based on the first portion of the digital audio frames and the second portion of the digital audio frames, and the inference operation is performed based on the first portion of the digital audio frames and the second portion of the digital audio frames.

12. The method of claim 10, wherein transmitting of the first portion of the digital audio frames begins prior to the determination that the speech instance has concluded.

13. The method of claim 10, wherein the determination that the first portion of the digital audio frames includes speech is performed by a speech detector that is configured to detect a presence of speech in the digital audio frames, and the determination that the speech instance has concluded is performed by the conversation classifier that is configured to determine whether the digital audio frames include speech that indicates an end of the speech instance.

14. The method of claim 10, further comprising:
receiving a second portion of the digital audio frames that include speech after the start signal to perform the inference operation has been sent; and
transmitting a cancellation signal to the generative response engine to cancel the inference operation based on the first portion of the digital audio frames.

15. The method of claim 14, further comprising:
receiving a response from performance of the inference operation based on the first portion of the digital audio frames from the generative response engine while receiving the second portion of the digital audio frames; and
discarding the response.

16. The method of claim 10, further comprising:
receiving a response from performance of the inference operation based on the first portion of the digital audio frames from the generative response engine; and
sending the response to the client device.

17. The method of claim 16, further comprising:
determining a first digital audio frame of the digital audio frames after the first portion of the digital audio frames corresponds to silence, wherein the first digital audio frame includes a nonce word.

18. The method of claim 10, wherein the conversation classifier is configured to indicate a second portion of the digital audio frames e-before the first portion of the digital audio frames correspond to an incomplete clause and the first portion of the digital audio frames and the second portion of the digital audio frames correspond to the independent clause.

* * * * *